United States Patent
Ackeret et al.

(10) Patent No.: US 9,527,456 B2
(45) Date of Patent: Dec. 27, 2016

(54) DEVICE FOR RETAINING FLAT, APPROXIMATELY RECTANGULAR APPLIANCES SUCH AS TABLET COMPUTERS OR MOBILE TELEPHONES IN THE INTERIOR OF A MOTOR VEHICLE

(71) Applicant: Kinetix AG, Glarus (CH)

(72) Inventors: Peter Ackeret, Zurich (CH); Juergen Siegfried Skott, Altensteig (DE); Andreas Michael Keller, Freudenstadt (DE)

(73) Assignee: Kinetix AG, Glarus (CH)

( * ) Notice: Subject to any disclaimer, the term of this patent is extended or adjusted under 35 U.S.C. 154(b) by 0 days.

(21) Appl. No.: 14/437,501

(22) PCT Filed: Nov. 5, 2013

(86) PCT No.: PCT/EP2013/073080
§ 371 (c)(1),
(2) Date: Aug. 7, 2015

(87) PCT Pub. No.: WO2014/068146
PCT Pub. Date: May 8, 2014

(65) Prior Publication Data
US 2015/0329062 A1    Nov. 19, 2015

(30) Foreign Application Priority Data

Nov. 5, 2012 (CH) ........................... 2257/12
Nov. 30, 2012 (CH) ........................... 2629/12
(Continued)

(51) Int. Cl.
A47B 96/06   (2006.01)
B60R 11/02   (2006.01)
(Continued)

(52) U.S. Cl.
CPC ............ B60R 11/0241 (2013.01); B60R 11/02 (2013.01); B60R 11/0252 (2013.01);
(Continued)

(58) Field of Classification Search
CPC combination set(s) only.
See application file for complete search history.

(56) References Cited

U.S. PATENT DOCUMENTS 4,165,856 A * 8/1979 Wiseheart .............. A47B 97/04
                                                248/161
4,455,008 A * 6/1984 MacKew ................. A47C 7/70
                                                248/447.1
(Continued)

FOREIGN PATENT DOCUMENTS

CN      1414766 A      4/2003
DE      297 08 702     8/1997
(Continued)

*Primary Examiner* — Monica Millner

(57) ABSTRACT

A device for retaining flat, approximately rectangular appliances such as tablet computers or mobile telephones in the interior of a motor vehicle, has a fastening apparatus for fastening the device to a vehicle component, a retainer for accommodating the appliances, and a transfer assembly, which is provided between the retainer and the fastening apparatus and with which the retainer can be moved into different positions in relation to the vehicle component. The transfer assembly has a support element, which is arranged on the fastening apparatus and which has a first revolute joint having an axis of rotation oriented approximately vertically, and a pivot arm, which is arranged near the upper end of the support element and which has a second revolute joint having an axis of rotation oriented approximately horizontally. The pivot arm is connected to the retainer.

14 Claims, 36 Drawing Sheets

(30) Foreign Application Priority Data

| | | |
|---|---|---|
| Jan. 21, 2013 | (CH) | 249/13 |
| May 6, 2013 | (CH) | 921/13 |
| May 18, 2013 | (CH) | 992/13 |
| Jun. 1, 2013 | (CH) | 1059/13 |
| Jul. 9, 2013 | (CH) | 1233/13 |
| Jul. 21, 2013 | (CH) | 1301/13 |
| Oct. 2, 2013 | (CH) | 1704/13 |

(51) Int. Cl.
  *F16M 11/04* (2006.01)
  *F16M 11/10* (2006.01)
  *F16M 11/20* (2006.01)
  *F16M 13/02* (2006.01)
  *B60R 11/00* (2006.01)

(52) U.S. Cl.
  CPC ......... *F16M 11/041* (2013.01); *F16M 11/105* (2013.01); *F16M 11/2064* (2013.01); *F16M 13/02* (2013.01); *B60R 2011/0003* (2013.01); *B60R 2011/0007* (2013.01); *B60R 2011/0061* (2013.01); *B60R 2011/0078* (2013.01); *B60R 2011/0084* (2013.01); *B60R 2011/0085* (2013.01); *B60R 2011/0087* (2013.01); *B60R 2011/0089* (2013.01)

(56) References Cited

U.S. PATENT DOCUMENTS

| | | | | |
|---|---|---|---|---|
| 4,836,486 | A * | 6/1989 | Vossoughi | F16M 11/04 248/280.11 |
| 4,946,120 | A * | 8/1990 | Hatcher | B60R 11/0252 108/44 |
| 5,179,447 | A * | 1/1993 | Lain | A47C 7/72 248/917 |
| 5,485,793 | A * | 1/1996 | Crowell | B60N 3/002 108/44 |
| 5,673,628 | A * | 10/1997 | Boos | B60N 3/001 108/138 |
| 5,751,548 | A * | 5/1998 | Hall | F16C 11/10 248/122.1 |
| 5,769,369 | A * | 6/1998 | Meinel | B60N 3/001 108/45 |
| 5,850,997 | A * | 12/1998 | Rosen | B64D 11/0015 248/222.11 |
| 6,158,793 | A * | 12/2000 | Castro | B60R 11/02 224/548 |
| 6,179,263 | B1 * | 1/2001 | Rosen | B60R 11/0235 248/278.1 |
| 6,279,992 | B1 * | 8/2001 | Plocher | B60N 3/004 108/44 |
| 6,386,413 | B1 * | 5/2002 | Twyford | B60R 11/0252 108/138 |
| 6,585,201 | B1 * | 7/2003 | Reed | B60R 11/0235 248/181.1 |
| 7,040,699 | B2 * | 5/2006 | Curran | B60K 35/00 248/919 |
| 7,121,514 | B2 * | 10/2006 | Twyford | B60R 11/0235 108/44 |
| 7,261,266 | B2 * | 8/2007 | Satterfield | B60R 11/0235 248/284.1 |
| 7,399,033 | B2 * | 7/2008 | Hsiao | B60R 11/0235 248/921 |
| 7,403,613 | B2 * | 7/2008 | Liou | B60R 11/00 379/446 |
| 7,946,542 | B1 | 5/2011 | Chapman | |
| 8,025,015 | B1 * | 9/2011 | Kennedy, Sr. | B60R 11/0252 108/152 |
| 8,523,130 | B2 * | 9/2013 | Westerink | B64D 11/0015 16/363 |
| 8,704,960 | B2 * | 4/2014 | Weaver | B60R 11/0235 192/107 C |
| 9,027,486 | B1 * | 5/2015 | Berkovitz | B60N 2/468 108/40 |
| 9,103,487 | B2 * | 8/2015 | Hale | F16M 13/022 |
| 2002/0066392 | A1 * | 6/2002 | Calam | B60N 2/468 108/33 |
| 2002/0190171 | A1 * | 12/2002 | Stock | B60R 11/0211 248/224.7 |
| 2004/0035990 | A1 * | 2/2004 | Ackeret | A47F 3/005 248/176.1 |
| 2006/0219857 | A1 | 10/2006 | Satterfield | |
| 2006/0290654 | A1 * | 12/2006 | Wang | B60R 11/0235 345/156 |
| 2007/0022583 | A1 * | 2/2007 | Carnevali | B60R 11/0241 24/523 |
| 2007/0284500 | A1 * | 12/2007 | Fan | B60R 11/02 248/346.06 |
| 2009/0060473 | A1 * | 3/2009 | Kohte | F16M 11/041 386/200 |
| 2009/0212184 | A1 * | 8/2009 | Bourgeois | F16M 11/04 248/288.11 |
| 2010/0038505 | A1 * | 2/2010 | Sonnenberg | F16M 11/041 248/226.11 |
| 2010/0213335 | A1 * | 8/2010 | Peng | B60R 11/02 248/276.1 |
| 2011/0049321 | A1 * | 3/2011 | Wu | B60R 11/02 248/339 |
| 2011/0073743 | A1 * | 3/2011 | Shamie | B60R 11/02 248/537 |
| 2011/0121148 | A1 * | 5/2011 | Pernia | B60R 11/0229 248/207 |
| 2011/0174937 | A1 * | 7/2011 | Sullivan | F16M 11/08 248/122.1 |
| 2011/0278885 | A1 * | 11/2011 | Procter | B60R 11/0235 297/135 |
| 2012/0006870 | A1 | 1/2012 | Proctor | |
| 2012/0126074 | A1 * | 5/2012 | Garon | G10G 7/00 248/220.22 |
| 2012/0206867 | A1 * | 8/2012 | Pence | F16M 11/041 361/679.01 |
| 2012/0313404 | A1 * | 12/2012 | Ackeret | B60N 3/002 297/163 |
| 2013/0037590 | A1 * | 2/2013 | Yoon | B60R 11/02 224/483 |
| 2013/0083507 | A1 * | 4/2013 | Guirlinger | F16M 13/00 361/809 |
| 2013/0193174 | A1 * | 8/2013 | Ackeret | F16M 11/105 224/275 |
| 2013/0200119 | A1 * | 8/2013 | Ackeret | B60R 11/0235 224/275 |

FOREIGN PATENT DOCUMENTS

| | | |
|---|---|---|
| DE | 102 30 643 | 2/2004 |
| DE | 10 2011 075 621 | 11/2011 |
| DE | 20 2011 106 677 | 12/2011 |
| DE | 20 2011 107 952 | 4/2012 |

* cited by examiner

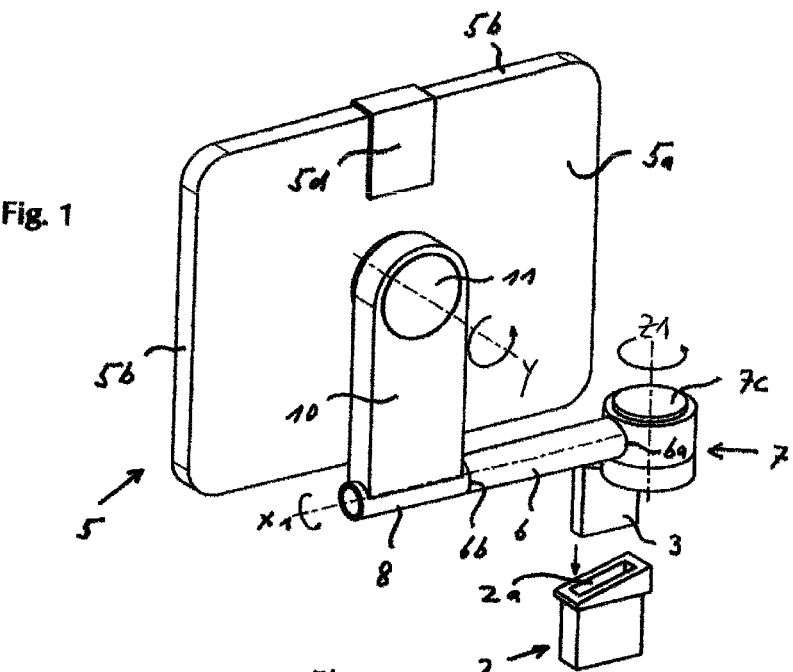
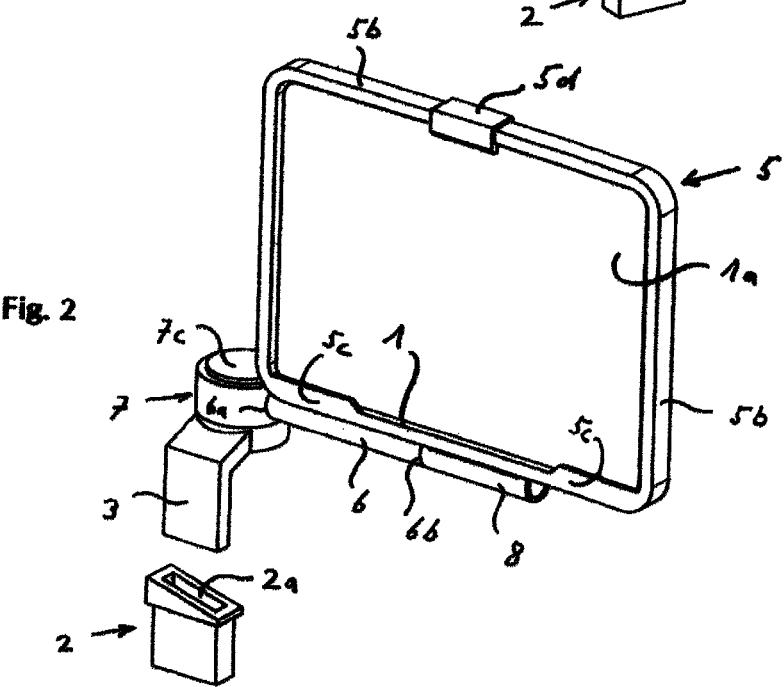

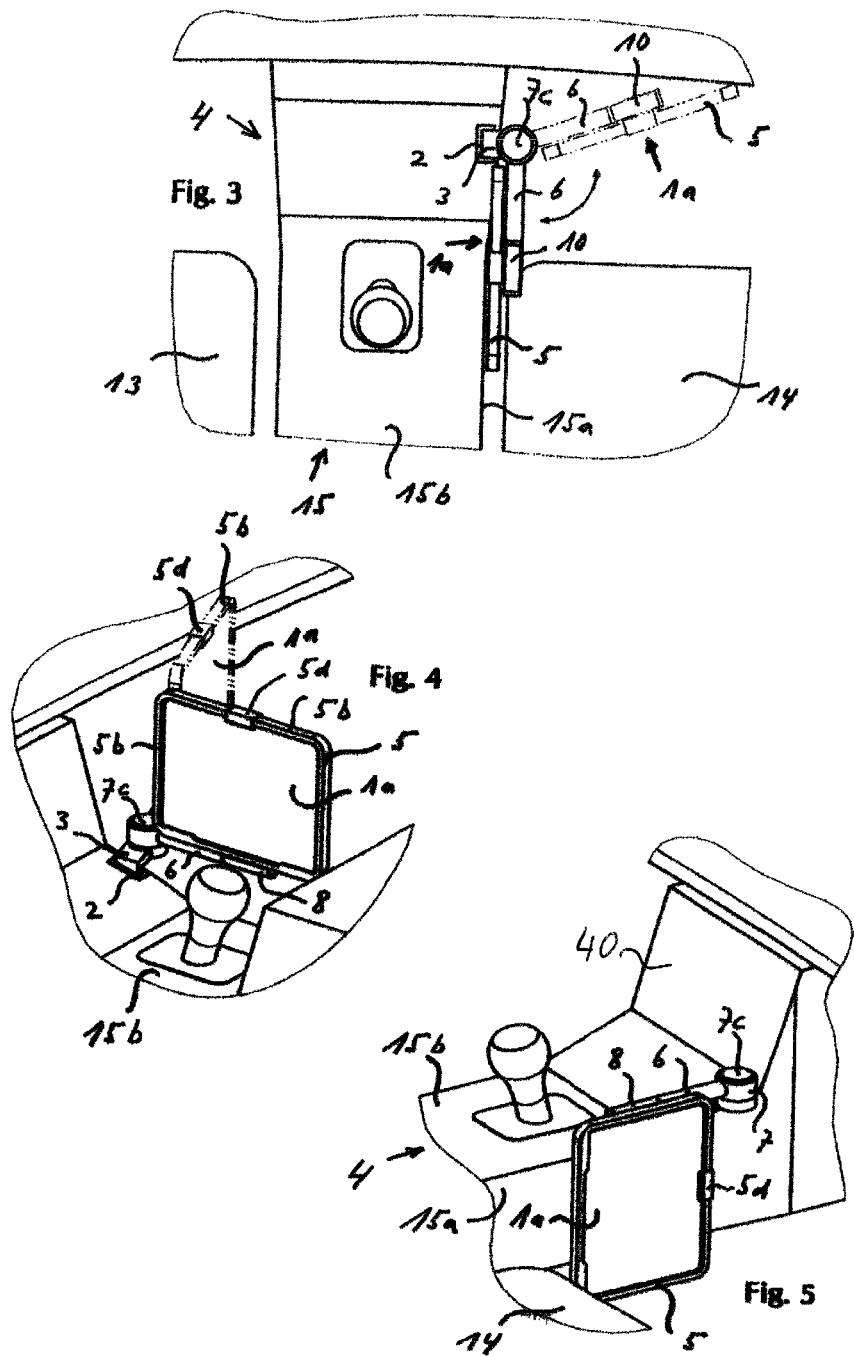

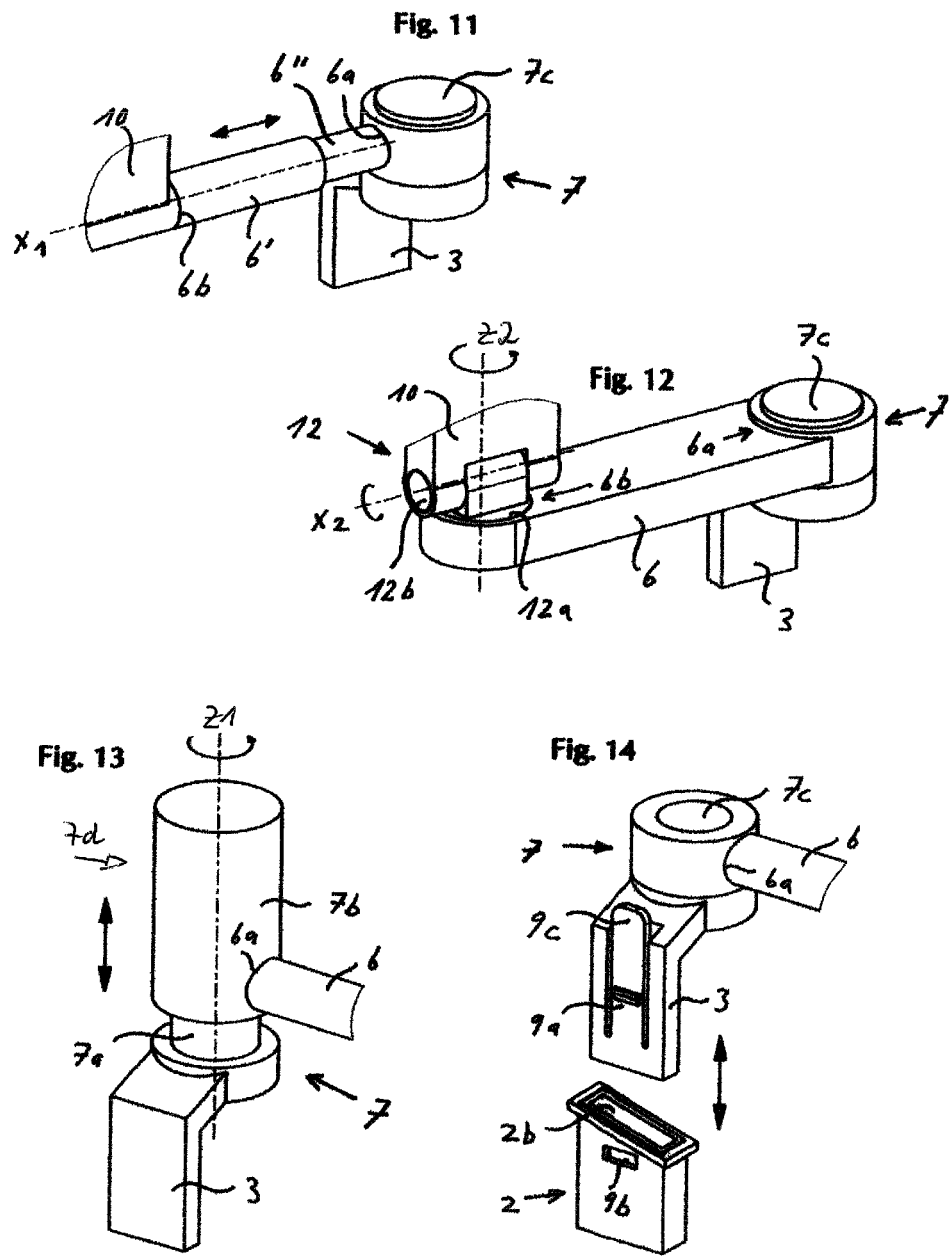

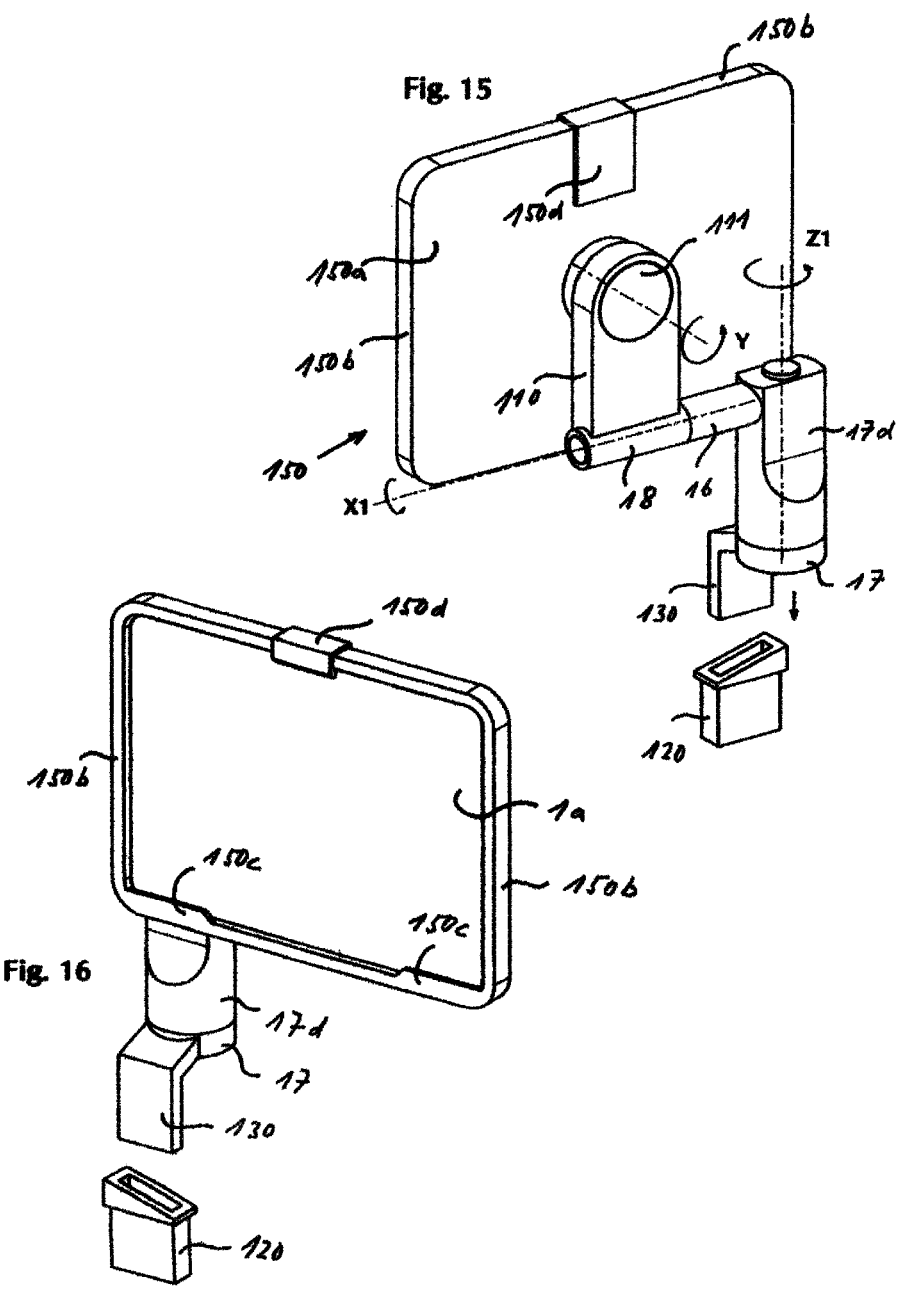

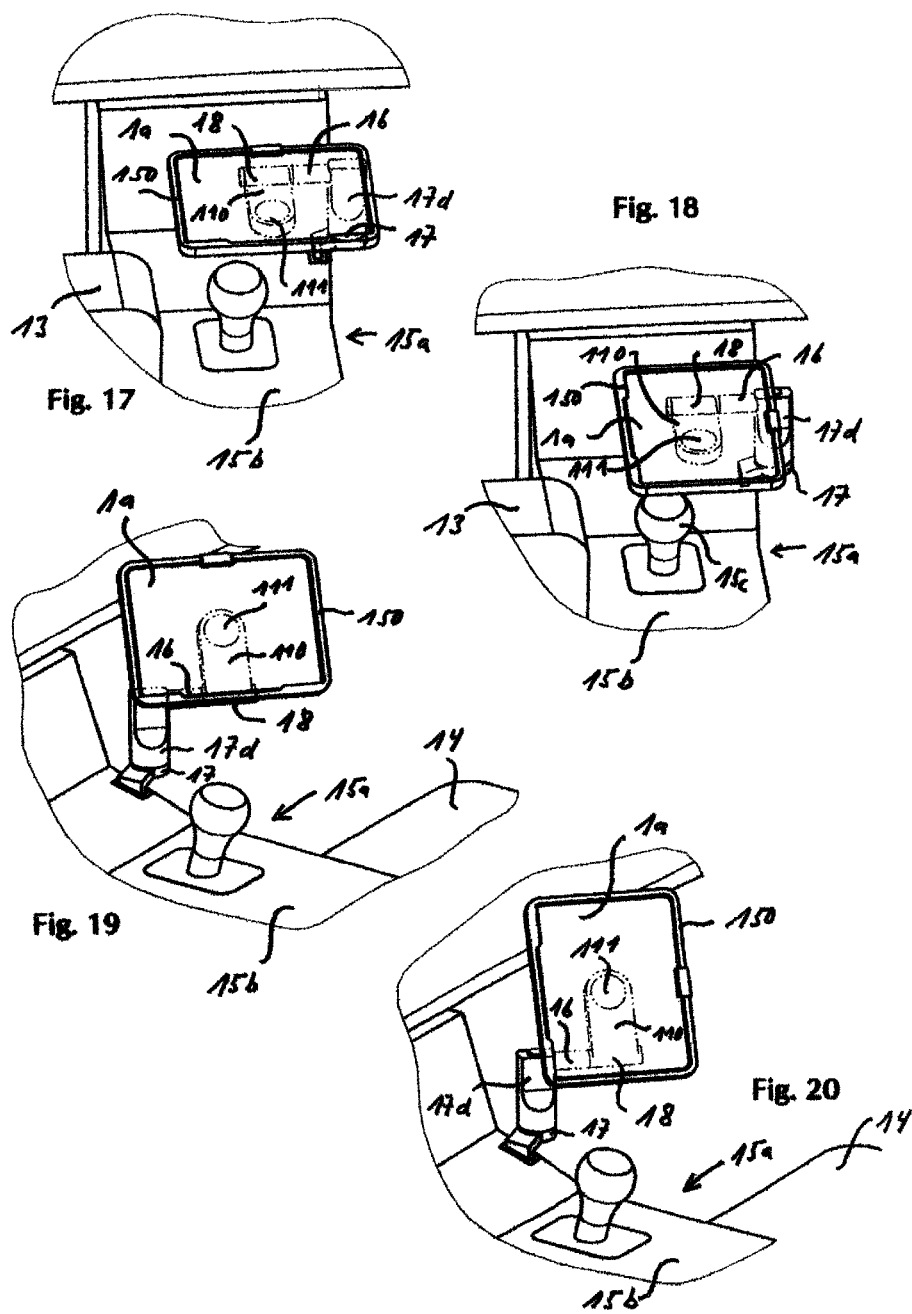

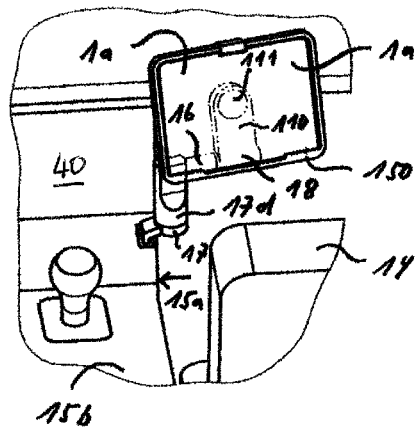
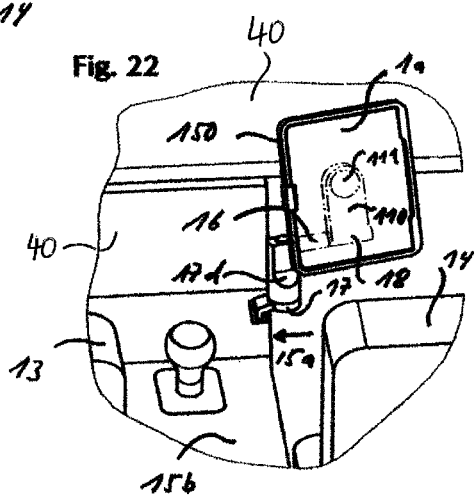
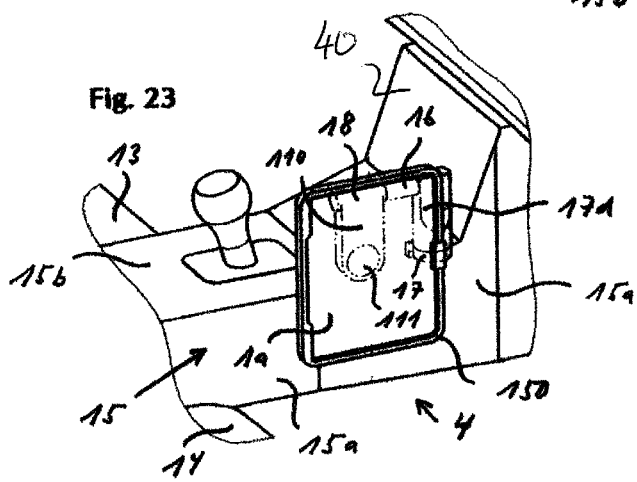

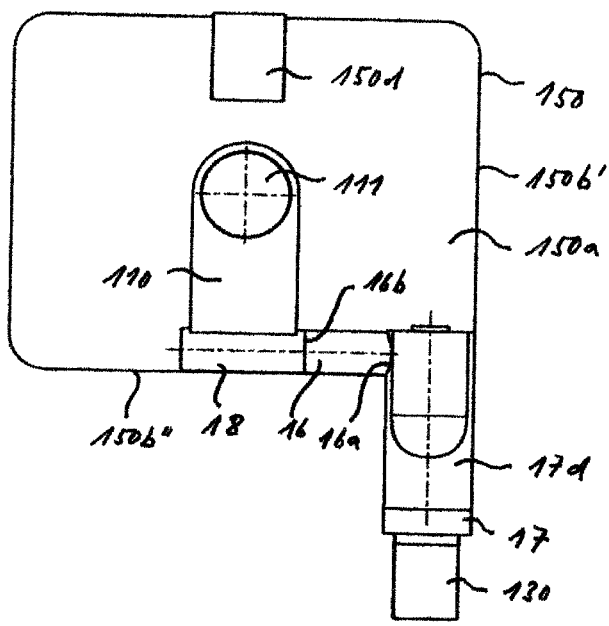
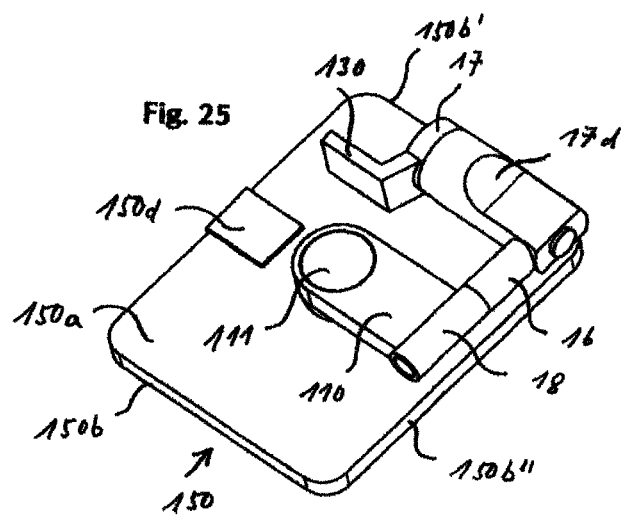

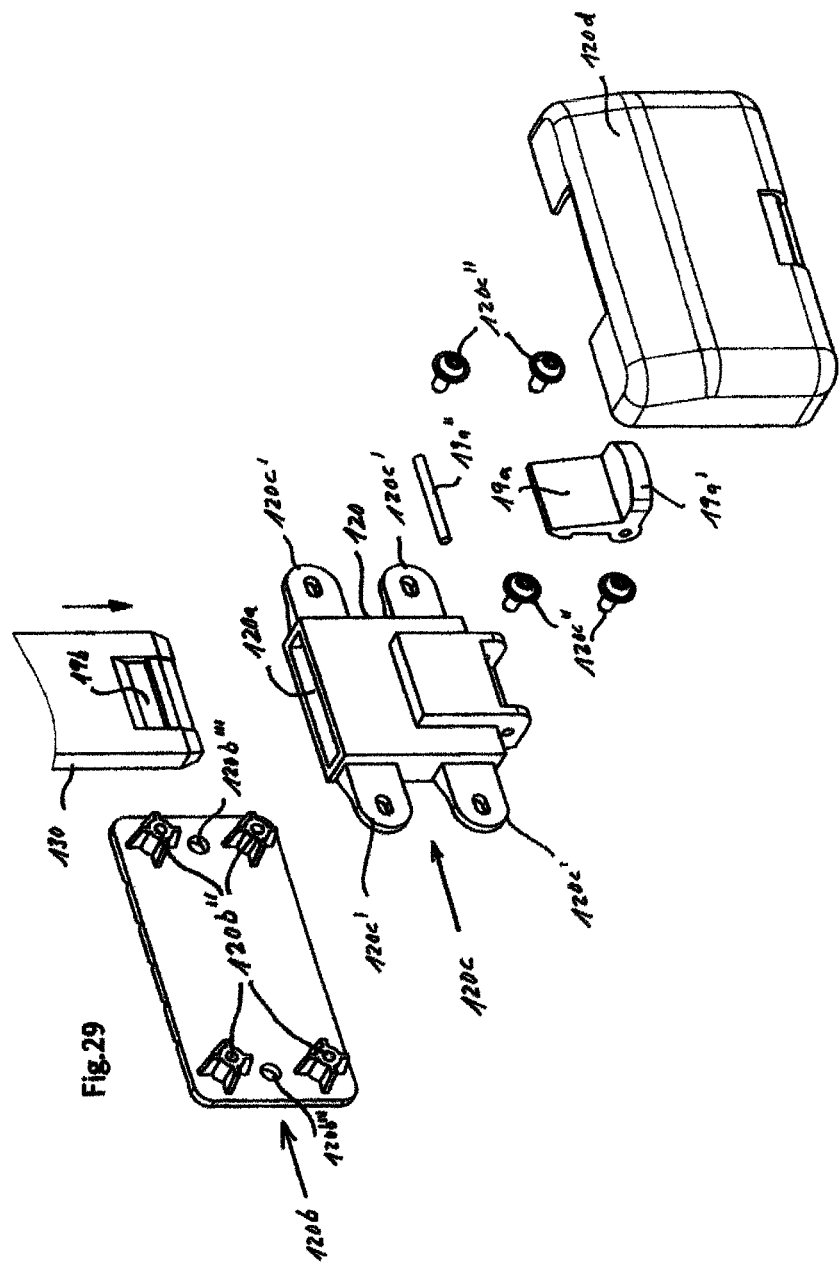

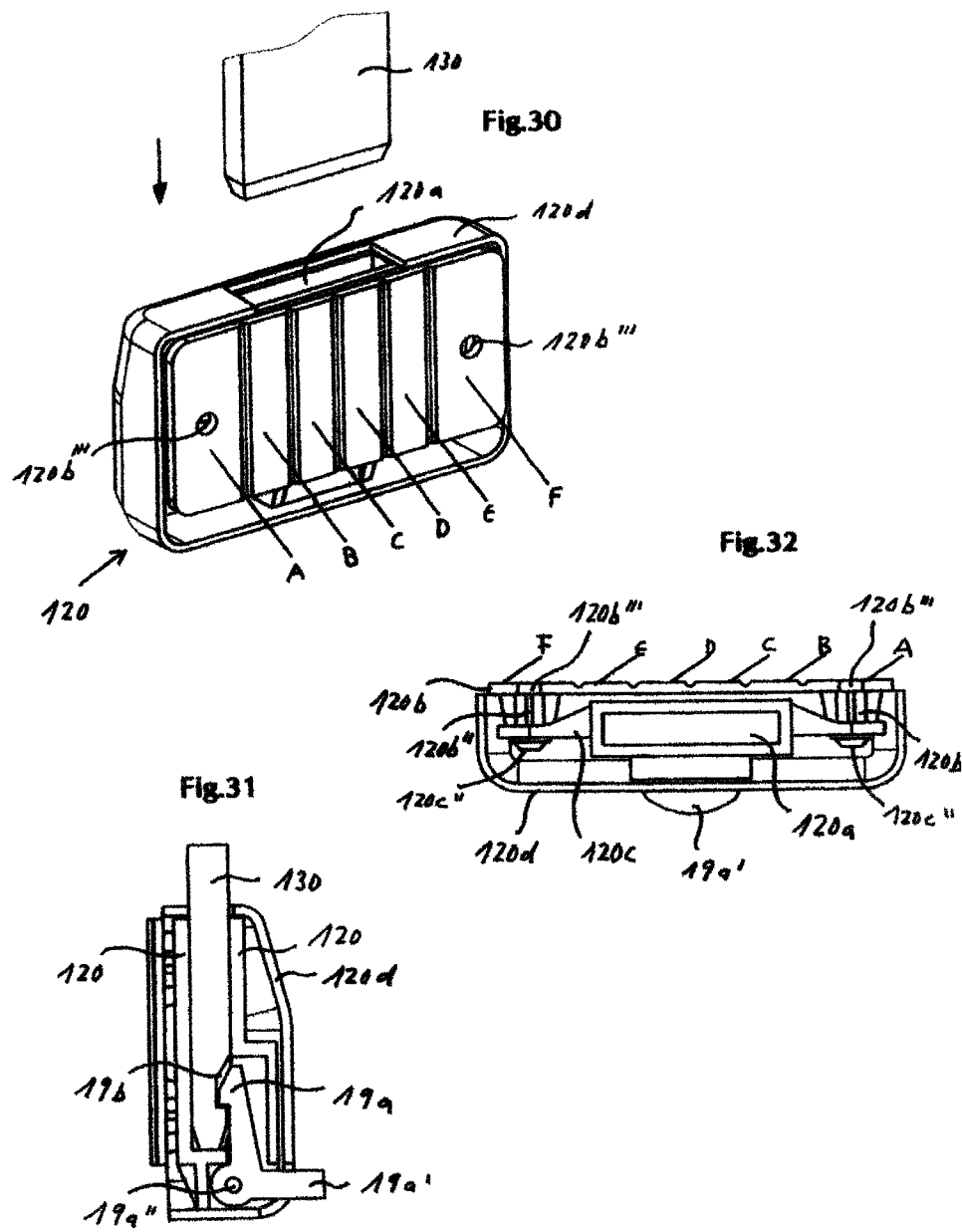

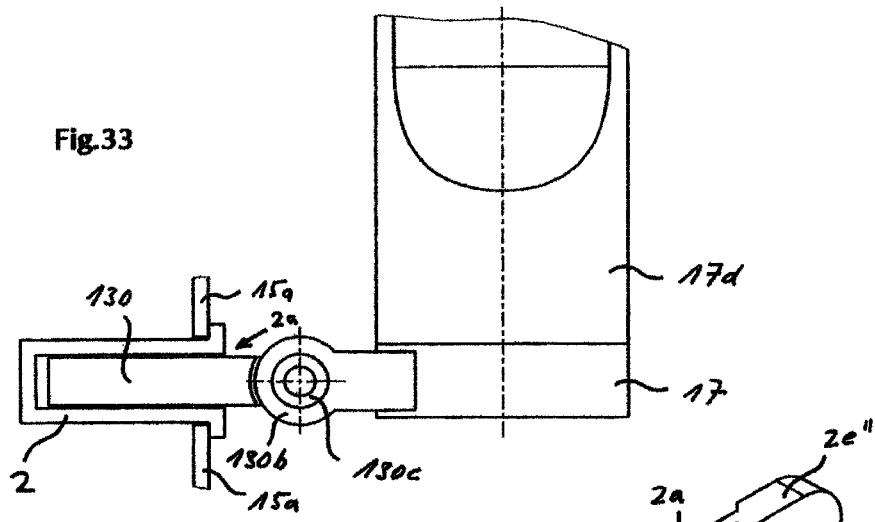
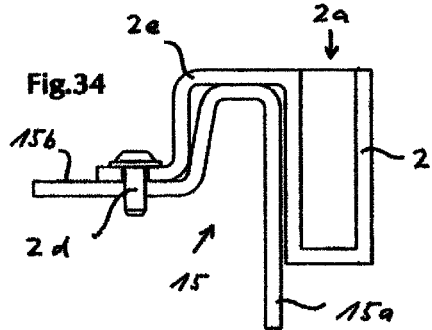
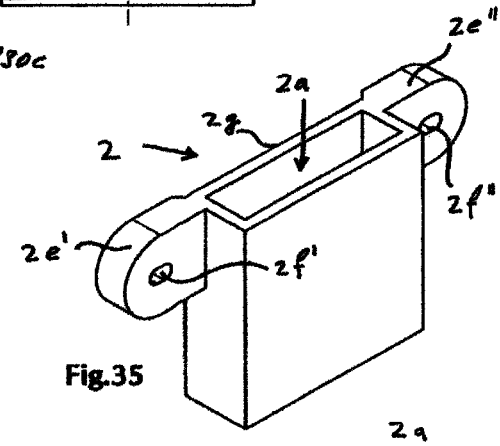
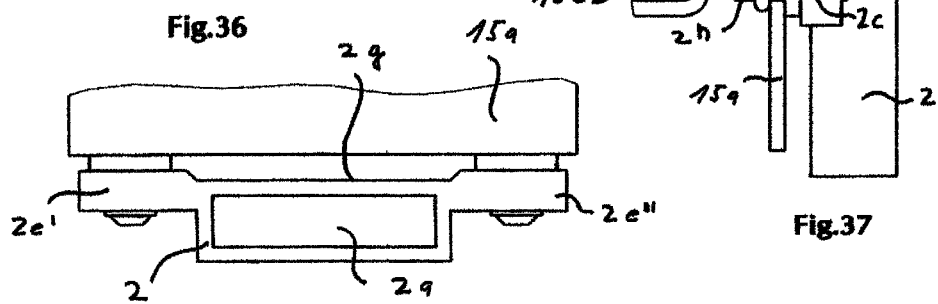

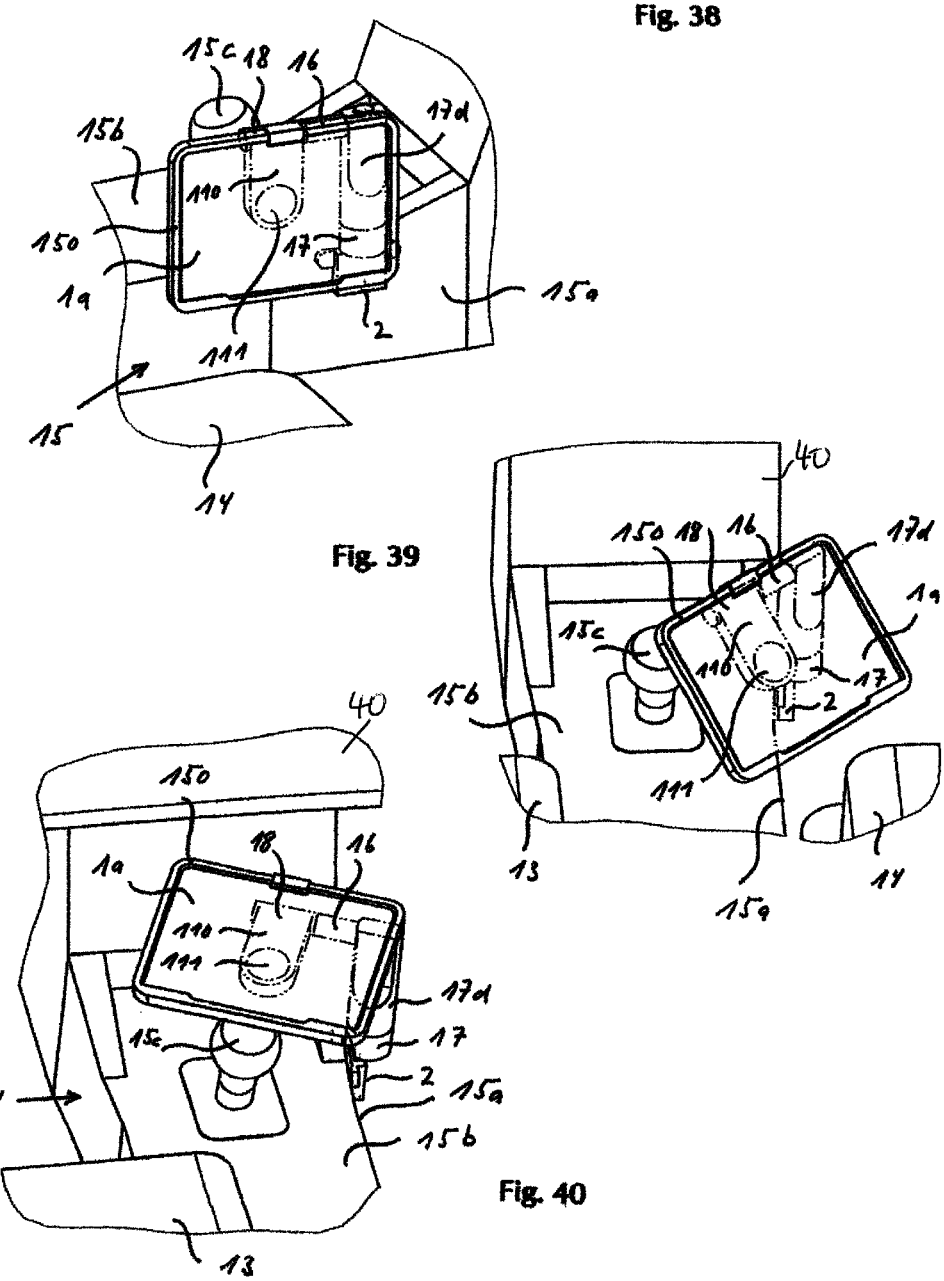

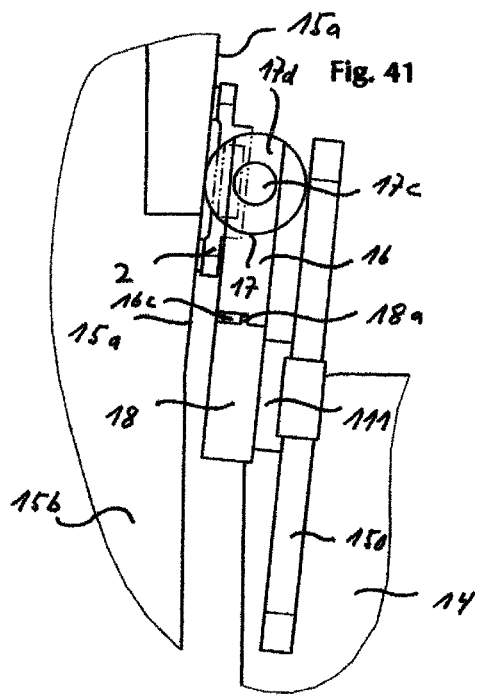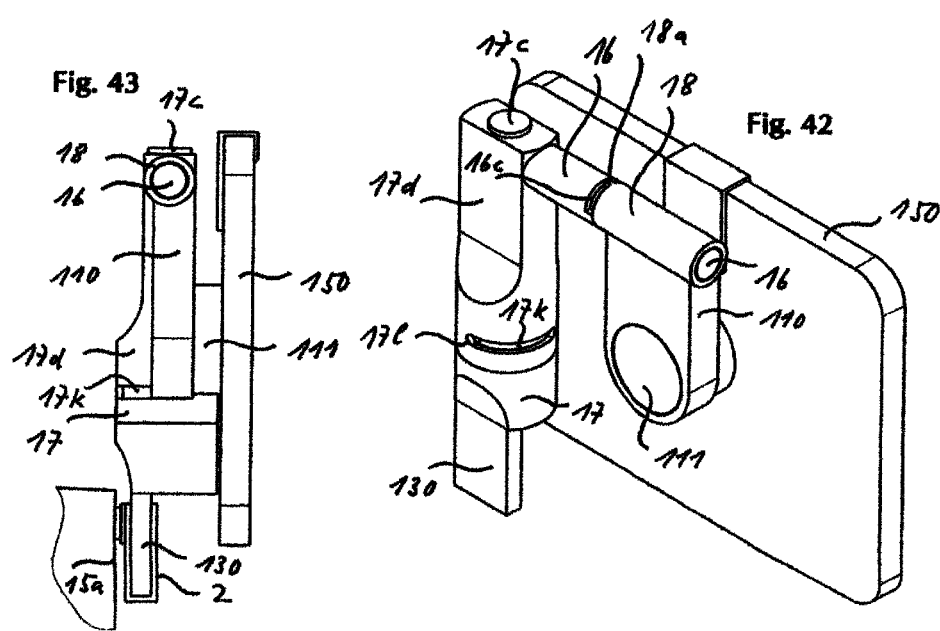

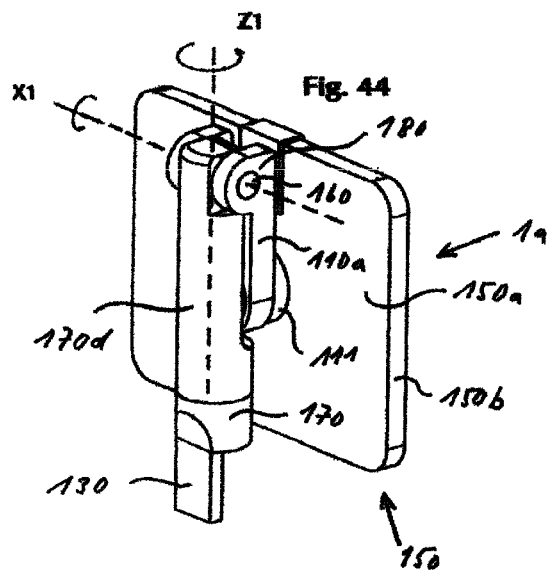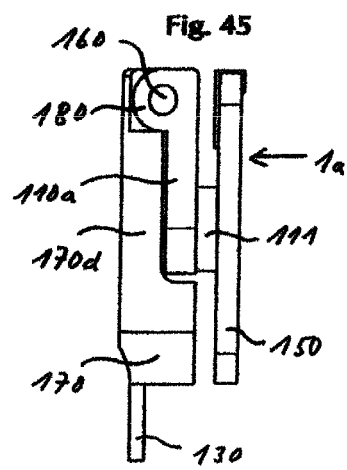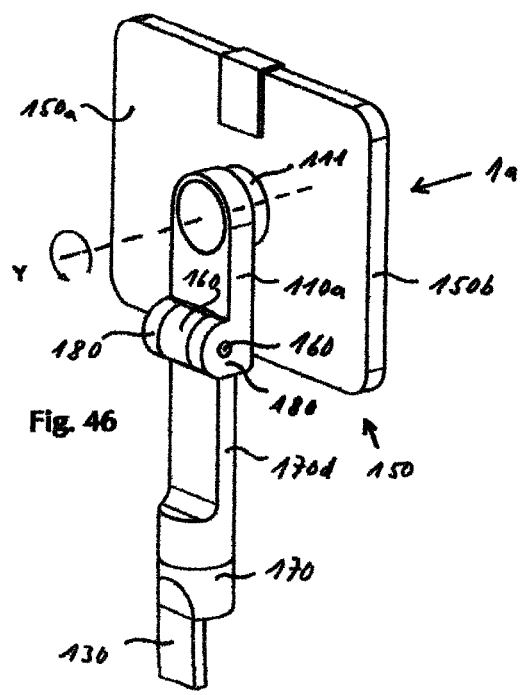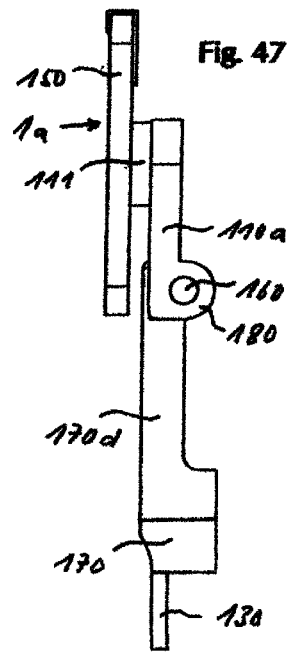

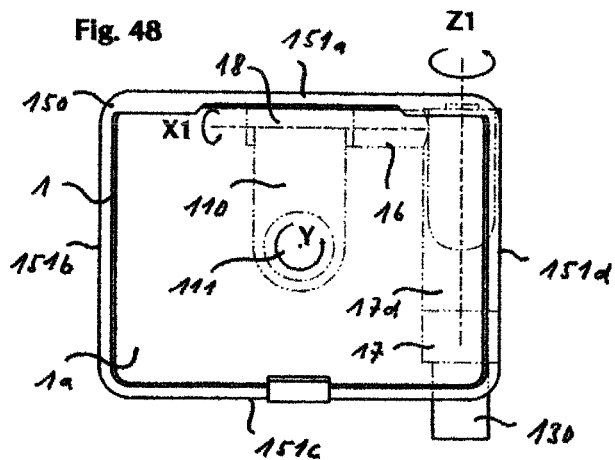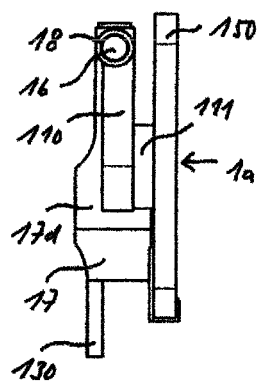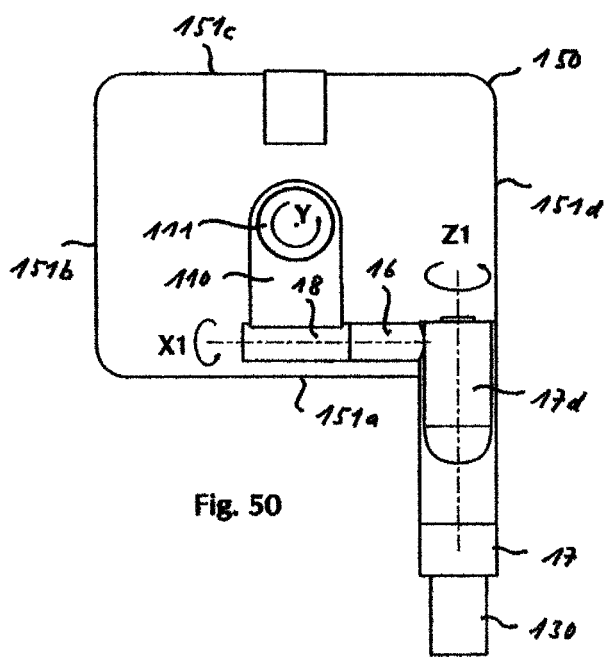

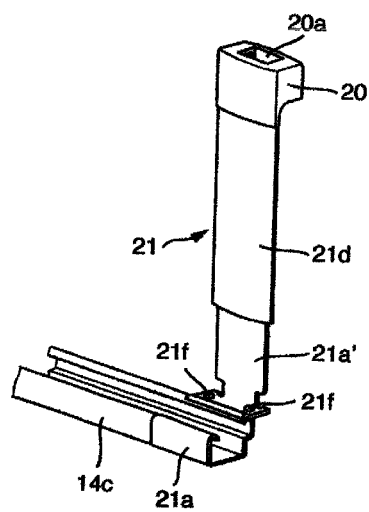
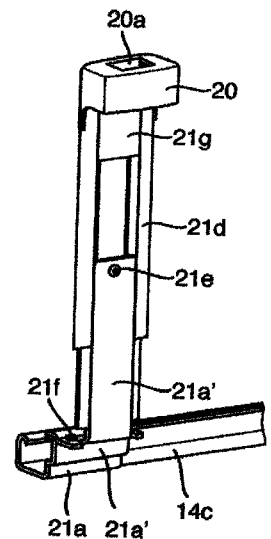
Fig. 54
Fig. 55
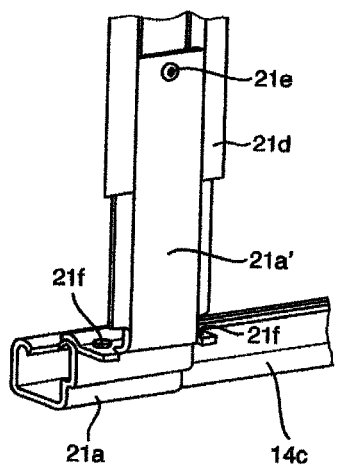
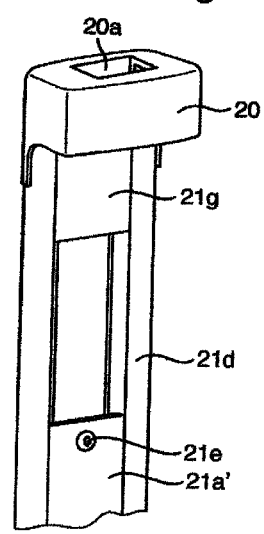
Fig. 56
Fig. 57

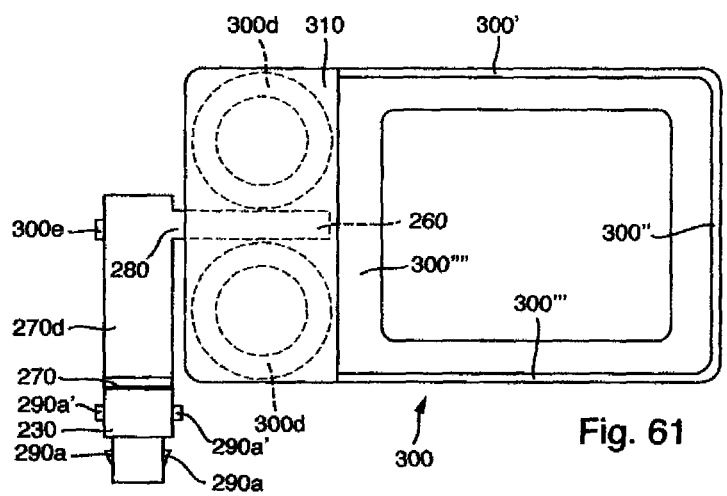
Fig. 61
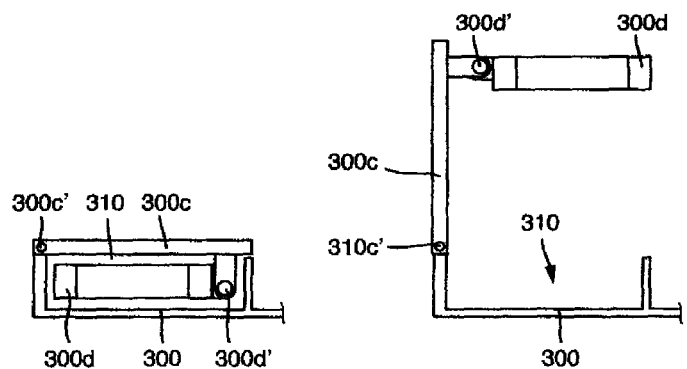
Fig. 62
Fig. 63

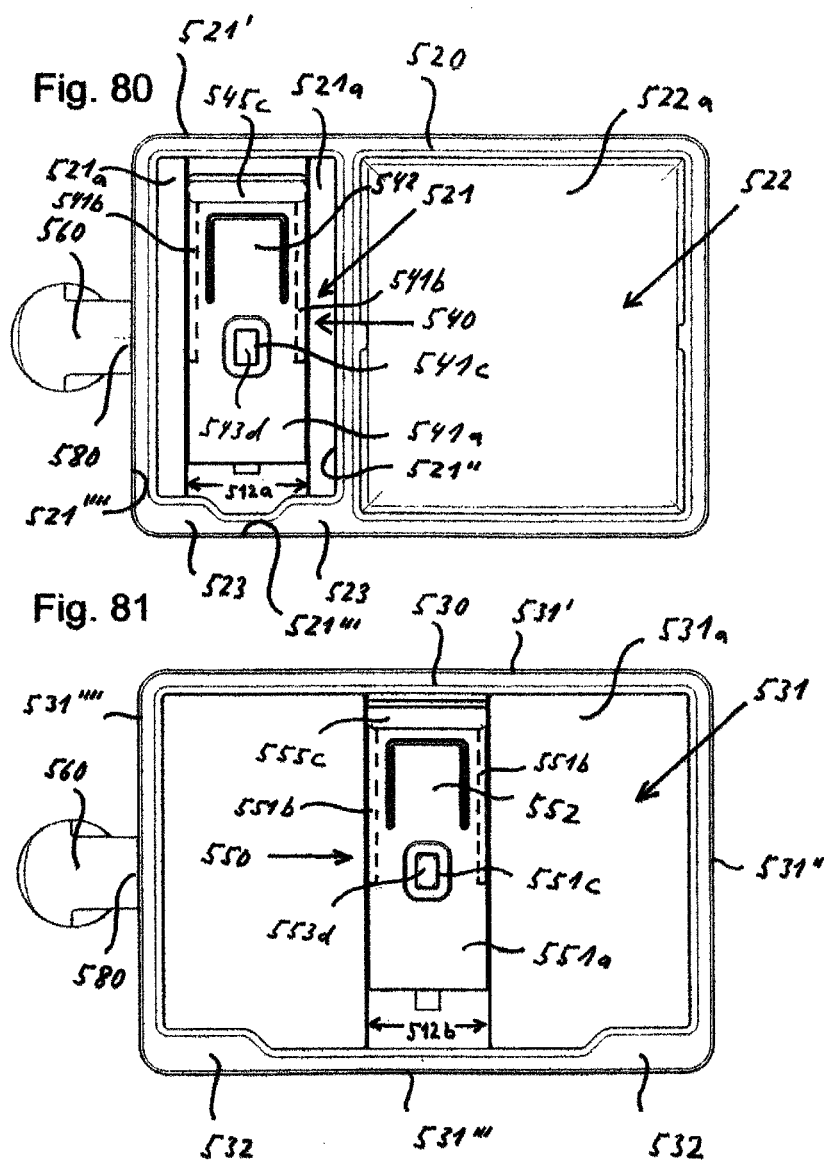

DEVICE FOR RETAINING FLAT, APPROXIMATELY RECTANGULAR APPLIANCES SUCH AS TABLET COMPUTERS OR MOBILE TELEPHONES IN THE INTERIOR OF A MOTOR VEHICLE

This application is the national stage of PCT/EP2013/073080 filed Nov. 5, 2013 and claims Paris convention priority from CH 2257/12 filed Nov. 5, 2013, CH 2629/12 filed Nov. 30, 2012, CH 249/13 filed Jan. 21, 2013, CH 921/13 filed May 6, 2013, CH 992/13 filed May 18, 2013, CH 1059/13 filed Jun. 1, 2013 and CH 1233/13 filed Jul. 9, 2013.

BACKGROUND OF THE INVENTION

The invention relates to a device for retaining flat, approximately rectangular appliances such as tablet computers or mobile telephones in the interior of a motor vehicle, in particular for use by the driver or the front seat passenger of the vehicle. The invention relates to a retainer for flat, approximately rectangular appliances, such as tablet computers or mobile telephones, in particular a retainer for such a device.

The rapid spread of tablet computers and mobile telephones, in particular so-called "smartphones" is inducing more and more companies to use tablet computers and smartphones for their internal communications. This particularly applies to communication between the company headquarters and field staff.

Tablet computers and smartphones also enable reception of numerous information and entertainment programs that are of interest to the front seat passenger.

For rear seat passengers, holders for tablet computers and smartphones disposed on the rear side of the driver's or front passenger seat are provided or can be retrofitted.

Various new vehicles are equipped with holders for smartphones, usually in lockable storage compartments under the arm rest and screens resembling tablet computers on the instrument panel, which permit interactive communication but which primarily provide information to the driver concerning the vehicle and traffic.

Because the front seats of vehicles are usually not fitted with foldout tables, the tablet computers must be placed on the front passenger seat or the center arm rest for use by the driver. However, the front passenger seat is often occupied by a person or other objects and a flat space on the center console is usually only available to a very limited extent. Files are often needed for work on the tablet computer, which additionally makes handing the tablet computer more difficult.

Use of a tablet computer by a front seat passenger without hindering the driver is only possible if the front seat passenger holds the tablet computer in their hands or on their legs, which is uncomfortable in the case of long use and can be dangerous in case of an accident.

Stands and retainers for tablet computers and smartphones for use by the driver are known, but access to them is often complicated and they hinder or prevent use of the front passenger seat or handling of the operating elements of the vehicle or they cover the displays and ventilation nozzles or endanger the safety of the vehicle occupants in accidents.

A first object of the invention is a device for retaining flat, approximately rectangular appliances such as tablet computers or mobile telephones in the interior of a motor vehicle, which permits the comfortable use of these appliances either by the driver or by the front seat passenger in different in-use positions, without preventing or restricting operation of the vehicle or endangering the vehicle occupants.

SUMMARY OF THE INVENTION

This object is achieved with a device for retaining flat, approximately rectangular appliances such as tablet computers or mobile telephones in the interior of a motor vehicle with the characteristics of an independent claim.

The invention is therefore characterized by a fastening apparatus for fastening the device to a vehicle component as well as a retainer for accommodating the appliances, and a transfer assembly, which is provided between the retainer and the fastening apparatus and by means of which the retainer can be moved into different positions in relation to the vehicle component, wherein the transfer assembly comprises a support element, which is disposed on the fastening apparatus and which has a first revolute joint having an axis of rotation oriented approximately vertically, and a pivot arm, which is disposed near the upper end of the support element and which has a second revolute joint having an axis of rotation oriented approximately horizontally, said pivot arm being connected to the retainer.

The transfer assembly permits a very simple, robust and compact structure of the device with the possibility of moving the retainer with the tablet computer within a tight space into any desired in-use position in portrait or landscape format for comfortable use by the driver and/or the front seat passenger or into an out-of-use position in which neither the driver nor the front seat passenger nor operation of the vehicle is restricted.

Advantageous embodiments of the invention can arise, in particular, if the vehicle component comprises a center console that is disposed centrally between the driver's and the front passenger seat, and wherein the support element is disposed in the proximity of a side wall of the center console and near to the instrument panel of the motor vehicle and wherein the retainer points backward from the support element between a stowed position in which the retainer is aligned with its wide side approximately vertically and parallel with the side wall of the center console and can be moved into different in-use positions in which the screen of an appliance used in the retainer in different rotation and inclination positions around the first and second revolute joint is aligned toward the driver and the front seat passenger;

the retainer has an approximately rectangular outside contour and the axis of rotation of the second revolute joint extends approximately parallel with the longitudinal sides of the retainer;

the retainer is connected to the pivot arm on one narrow side preferably centrally;

the retainer is connected to the pivot arm in the proximity of a longitudinal side on the narrow side;

the pivot arm is disposed on a longitudinal side of the retainer;

the retainer is connected via a support arm to the pivot arm;

the longitudinal axis of the pivot arm and the longitudinal axis of the support arm are approximately mutually perpendicular;

the retainer on its rear wall is connected to the support arm via a third revolute joint whose axis of rotation extends perpendicular with respect to the wide side of the rear wall, and can be rotated between a horizontal and a vertical in-use orientation by at least 90°;

the axis of rotation of the third revolute joint is disposed approximately in the point of intersection of the two diagonals of the rear wall of the retainer;

between the pivot arm and the support arm, a double articulation is disposed, with a rotation bearing that is connected to the pivot arm and a swivel bearing that is connected to the support arm and wherein the rotation bearing rotates about an axis of rotation that extends parallel with the axis of rotation of the first revolute joint and the swivel bearing rotates about an axis of rotation that extends perpendicular with respect to the axis of rotation of the rotation bearing;

the support element and the pivot arm form an L-shaped component on whose one leg the first revolute joint and the second fastening means and on whose other leg the second revolute joint and the retainer are disposed;

in the out-of-use position the retainer is disposed next to and/or above the side wall facing toward the front passenger seat of the center console;

the retainer on the first revolute joint can be rotated out of the out-of-use position on both sides through approximately 120° to 135°;

the height of the support element is dimensioned so that the rotation plane of the retainer is so high that the retainer can be swiveled both over the legs of the front seat passenger and over the knob of the gear lever toward the driver;

the retainer can be rotated 360° about the second revolute joint;

the first revolute joint and/or the second revolute joint and/or and the third revolute joint and/or the double articulation are provided with a friction brake and/or a latching device;

stops are provided on the first revolute joint that limit the angle of rotation of the pivot arm in predetermined positions;

stops are provided on the second revolute joint that limit the swivel angle of the retainer in predetermined positions;

the height of the support element is adjustable;

the length of the pivot arm is adjustable;

the retainer comprises an approximately rectangular receiving shell with a base wall and four circumferential side walls and a holder disposed on the base wall with which the appliances can be detachably fastened in the retainer and wherein the holders can be adapted to different dimensions of the appliances to be accommodated;

several retainers are disposed on one holder, which is connected to the pivot arm;

the holder has the shape of a flat parallelepiped with two approximately rectangular wide sides and two long and two short side walls and is connected on one of the short side walls, preferably centrally, to the pivot arm;

the holder can be rotated through 360° around its second rotation bearing and one retainer is disposed on each of the two wide sides of the holder;

a first receiving shell with a holder for a mobile telephone is part of a first housing shell, and a second receiving shell with a holder for a tablet computer is part of a second housing shell, and wherein the first housing shell and the second housing shell are disposed back to back to form the holder;

a holder plate is disposed between the first housing shell and the second housing shell, with a base wall with two slide guides aligned parallel with the narrow side of the holder for slides of the two holders and with a bearing bush disposed at the center of the facing end for accommodating the pivot arm;

the first housing shell together with the first receiving shell with a holder for a mobile telephone comprises a storage shell adjacent to the receiving shell;

the fastening apparatus comprises a first fastening means disposed on the vehicle component and a second fastening means that can be coupled with the first fastening means, on which the support element is disposed;

the first fastening means is constituted as a receiving bush and the second fastening means is constituted as a plug element;

the first fastening means and the second fastening means are held together with a manually releasable lock device;

the plug element is disposed at the lower end of the support element;

the first revolute joint is disposed between the plug element and the support element;

the receiving bush is integrated as an internally mounted part into a cavity of the center console or disposed as an externally mounted part on the outer side of the center console;

the receiving bush is vertically oriented in the center console and wherein the plug-in opening for the plug element is disposed on the upper side of the center console, preferably near the side wall facing toward the front passenger seat of the center console;

the receiving bush is horizontally oriented in the center console and the plug-in opening for the plug element is disposed on the side wall facing toward the front passenger seat of the center console;

the receiving bush is horizontally or vertically disposed as a separate part on the outer side of the side wall facing toward the front passenger seat of the center console;

the plug-in opening of the receiving bush is locked with a spring-loaded hinged cover, which swivels open when the plug element is inserted and exposes the plug-in opening;

the plug element is connected to the support element via a revolute joint.

the fastening apparatus comprises a support disposed between the center console and the driver or front passenger seat, which is secured with a fastening element on the vehicle floor or on one of the guide rails of the driver seat or front passenger seat, disposed near the center console on the vehicle floor;

the fastening element grips round the front end of the guide rail from the outside;

the fastening element comprises an L-shaped plate oriented approximately at a right angle to the support and parallel with the vehicle floor, with a first section and a second section, and wherein the first section is inserted from the front into the guide rail and together with the guide rail is securely screwed to the vehicle floor, and the second section connects the first section with the support section of the support;

the fastening element together with the support section and the support form a one-piece punched and bent part;

the support is secured close to its upper end with a screwed or glued joint or with a hooked connection on the center console, in particular on the side wall of the center console;

the support comprises segments that can be moved in the longitudinal direction and a fixing element, so that the height of the support is adjustable;

a receiving bush is disposed at the upper end of the support with which a plug element disposed on the support element can be coupled; and/or the plug-in opening is disposed on the upper side of the receiving bush and can be closed with a spring-mounted hinged cover.

All of the slated characteristics may be essential to the invention either singly or in any combination.

Another object of the invention is to create a retainer for flat, approximately rectangular appliances such as tablet computers or mobile telephones, which can be adapted to different dimensions of the appliances and which guarantees optimum protection of the passengers from injury in case of an accident.

This object is achieved with a retainer with the characteristics of an independent claim. A retainer is provided, in particular a retainer of a device described above, with an approximately rectangular receiving shell with a base wall and four circumferential side walls as well as a holder with a U-shaped receiving pocket disposed on one side of the receiving shell, which grips round one edge of an appliance inserted into the holder, and a movably spring-mounted retaining clip with a hold-down retainer that covers the opposite edge of an appliance inserted in the holder, wherein a movably guided slide is provided on the base wall of the receiving shell, with a base plate and a stop plate disposed at the end of the base plate approximately perpendicular with respect to the base plate, the slide can be moved until the stop plate reaches the opposite edge of the appliance and can be secured in this position with a manually releasable lock device on the base wall, and the retaining clip with the hold-down retainer is guided movably on the slide and is preloaded against the stop plate with a spring, wherein the hold-down retainer at the end position of the retaining clip protrudes so far beyond the stop plate that the opposite edge of the appliance is covered.

Advantageous further embodiments of the invention are described in the dependent claims, wherein advantageous embodiments can arise, in particular, that the receiving pocket is constituted on one of the long side walls of the receiving shell;

on the base plate of the slide, guide rails are disposed that are guided in slide guides that extend parallel with the short side walls on the base wall of the receiving shell;

the lock device comprises at least one toothed rail, preferably on the underside, on the base wall of the receiving shell, and at least one tooth segment disposed movably on the base plate of the slide that is held with a locating spring engaged with the toothed rail, and wherein the tooth segment is moved out of the toothed rail with a release button disposed on the base plate of the slide so that the lock can be released;

the toothed rail and the tooth segment are provided with saw-tooth-shaped toothing, so that the slide can be pushed toward the appliance inserted in the holder without operating the release button, whereas the slide can only be moved in the opposite direction when the release button has been operated;

the tooth segment and the release button form a locking element, which is secured on the underside of the base plate of the slide with the locating spring constituted as a flat spring, and wherein a button cutout is provided in the base plate of the slide through which the release button upwardly protrudes.

a longitudinal cutout is recessed for the locking element in the base wall of the receiving shell between the slide guides;

the retaining clip comprises a base plate as well as a stop wall at the free end of the base plate aligned approximately perpendicular with respect to the base plate with a hold-down retainer aligned approximately parallel with the base plate and pointing toward the slide, wherein the base plate of the retaining clip is guided so that it can move longitudinally in the base plate of the slide;

a tension spring is disposed between the slide and the retaining clip, which pulls the retaining clip toward the slide until the stop wall of the retaining clip is positioned at the stop plate of the slide;

a depression is provided on the stop wall of the retaining clip in which the stop plate of the slide is accommodated in the end position of the retaining clip;

the hold-down retainer in the end position of the retaining clip protrudes so far beyond the stop plate of the slide that the edge of an appliance inserted in the holder is covered outside the screen so that the appliance cannot fall out of the holder, and wherein to remove the appliance from the holder, the retaining clip must be pulled behind the stop plate of the slide against the force of the tension spring until the appliance is free and can be removed from the holder;

a lifting facility is attached to the upper side of the base plate of the slide, which after the retaining clip with the hold-down retainer has been pulled back lifts an appliance inserted in the holder high enough so that it can be comfortably removed from the slide;

the short side walls of the receiving shells in which the holders for a mobile telephone or tablet computer are disposed, form lateral stops for the appliances inserted in the holders so that they cannot laterally slip out of the holders;

a first receiving shell with a holder for a mobile telephone forms part of a first housing shell, and a second receiving shell with a holder for a tablet computer forms part of a second housing shell, and wherein the first housing shell and the second housing shell are disposed back to back to form a holder, which can be connected by a transfer assembly to a vehicle component of a motor vehicle;

a first receiving shell with a holder for a mobile telephone forms part of a first housing shell or a second receiving shell with a holder for a tablet computer forms part of a second housing shell, and wherein the first housing shell or the second housing shell is disposed with a preferably flat rear wall and can be connected by a transfer assembly to a vehicle component of a motor vehicle;

a revolute joint is disposed between the rear wall of the second housing shell and the transfer assembly, with which the housing shell can be rotated between portrait format and landscape format;

a detachable coupling is provided, with which the housing shells can be connected to the vehicle component;

the detachable coupling comprises a plug element connected directly or indirectly to the housing shells and a receiving bush connected directly or indirectly to the vehicle component;

a first receiving shell with a holder for a mobile telephone forms part of a first housing shell or a second receiving shell with a holder for a tablet computer forms part of a second housing shell, and wherein the first housing shell or the second housing shell is equipped with a preferably flat rear wall connected to a first coupling element and can be detachably connected to a vehicle component equipped with a second coupling element of a motor vehicle;

the first coupling element comprises a preferably fold-in plug element and the second coupling element comprises a receiving bush; and/or the four circumferential side walls of the receiving shells cover the top edges of the appliances inserted in the holder.

All of the stated characteristics may be essential to the invention either singly or in any combination.

The transfer assembly preferably has a pivot arm, which is connected to the fastening apparatus via a first revolute joint having an axis of rotation oriented approximately vertically, and connected to the retainer or the holder via a second revolute joint having an axis of rotation oriented approximately horizontally.

The transfer assembly permits a very simple, robust, and compact structure of the device with the possibility of moving the retainer or the holder with the tablet computer and/or the mobile telephone within a tight space into any desired in-use position in portrait or landscape format for comfortable use by the driver and/or the front seat passenger or in an out-of-use position in which neither the driver nor the front seat passenger nor operation of the vehicle is restricted.

In a preferred embodiment, the device is secured in the vehicle oriented in such way that the axis of rotation of the first revolute joint extends approximately vertically and the pivot arm can be rotated preferably in a plane oriented approximately horizontally.

Preferably, the first revolute joint is disposed at the lower end of the support element between the plug element and the support element and the second revolute joint is disposed at the end of the pivot arm between the pivot arm and the retainer or the holder.

In a further preferred embodiment, the retainer has an approximately rectangular outside contour and the axis of rotation of the second revolute joint extends approximately parallel with two outside contours of the retainer, wherein the pivot arm is disposed near an outside contour of the retainer and is aligned parallel with the same.

In further preferred embodiment, the retainer is connected to the pivot arm via a support arm, wherein the longitudinal axis of the pivot arm and the longitudinal axis of the support arm are approximately mutually perpendicular.

Preferably, the support arm and the support element are aligned parallel with each other and are connected at right angles with the pivot arm at each end.

The retainer is preferably connected between its rear wall and the support arm via a third revolute joint whose axis of rotation extends perpendicular with respect to the wide side of the rear wall and can be rotated between a horizontal and a vertical in-use orientation by at least 90°; wherein the axis of rotation of the third revolute joint is preferably disposed approximately at the point of intersection of the two diagonals of the rear wall of the retainer.

In a further embodiment, a double articulation is disposed between the pivot arm and the support arm, with a rotation bearing that is connected to the pivot arm and a swivel bearing that is connected to the support arm, wherein the rotation bearing rotates about an axis of rotation that extends parallel with the axis of rotation of the first revolute joint and the swivel bearing rotates about an axis of rotation that extends perpendicular with respect to the axis of rotation of the rotation bearing.

In a further embodiment, manually releasable stops can be provided on the first revolute joint and/or on the second revolute joint and/or on the third revolute joint, which delimit the angle of rotation of the support element or of the pivot arm or of the retainer in predefined positions.

Preferably, the receiving bush is integrated as an internally mounted part into a cavity of a center console or disposed as an externally mounted part on the outer side of a center console.

In a further preferred embodiment, the receiving bush is vertically oriented in the center console and the plug-in opening for the plug element is disposed on the upper side of the center console, preferably close to the side wall facing toward the front passenger seat of the center console.

Alternatively, the receiving bush can be horizontally oriented in the center console and the plug-in opening for the plug element is disposed on the side wall facing toward the front passenger seat of the center console.

In a further preferred embodiment, the receiving bush is disposed horizontally or vertically oriented as a separate part on the outer side of the side wall facing toward the front passenger seal of the center console, wherein the receiving bush can be secured with a screwed or glued joint on the upper side or on a side wall facing toward the front passenger seat of the center console.

In a further preferred embodiment, the device is secured on a guide rail for one of the vehicle seats secured on the vehicle floor. For this, a support is preferably secured at the front end as seen from the direction of travel of the guide rail of the front passenger seat disposed next to the center console, which protrudes approximately vertically upward between the side wall of the center console facing toward the front passenger seat and the side wall of the front passenger seat facing toward the center console and at whose upper end the first fastening means and/or the receiving bush is disposed.

Preferably, the support is manufactured in one piece from a punched and bent part of stable metal sheet and comprises a fastening element with a first segment that protrudes from the front into the guide rail or that is disposed underneath the guide rail, and a second segment that points from the guide rail in the direction of the center console, as well as a support element on the second segment bent upward approximately at a right angle, wherein the wide sides of the two segments of the fastening element extend approximately parallel with the vehicle floor and the wide side of the support element extends approximately parallel with the side wall of the center console. The receiving bush open at the top is secured to the top end of the support element.

In a further preferred embodiment, the first segment of the fastening element is screwed to the guide rail on the vehicle floor by means of the screw that already exists in the vehicle for securing the guide rail.

Preferably, the support element rests against the contour of the side wall of the center console and is supported against the side wall of the center console with a rubber pad disposed at the upper end so that vibrations of the support and the devices secured to it are prevented.

To improve the stability of the support, a screw can be provided with which the support element can be securely screwed at the level of the rubber pad on the side wall of the center console.

Alternatively, a double-sided adhesive tape with a foam-rubber intermediate layer or a releasable hook-and-loop fastening or a hooked connection between the support element and the center console can be provided.

Alternatively, the support could be secured in the same way instead of to the guide rail of the front passenger seat also directly to the vehicle floor or to the side wall of the front passenger seat facing toward the center console.

Analogously with the previously described external mounting or internal mounting options of the first fastening means or of the receiving bush between the center console and the front passenger seat, the external mounting or internal mounting of the first fastening means or of the receiving bush could be implemented with the necessary adaptations between the center console and the driver seat.

In a further preferred embodiment, the first fastening means or the receiving bush can be disposed so that it can be moved parallel with the direction of travel and locked into different positions on a vehicle part, for example on the side wall of the center console or on the side wall of a vehicle seat or on the vehicle floor or on a guide rail for a vehicle seat.

In particular, in the out-of-use position of the retainer or holder, which is parallel with the direction of travel and vertically aligned, it is advantageous if the retainer or the holder can be moved parallel with the direction of travel, for example, backward between the backrests of the driver seats and front passenger seats.

In a preferred embodiment, the retainer can be moved, for example, via a horizontally disposed rail, in which a slide with the device is guided.

The first fastening means is preferably connected with the vehicle component via a spherical joint so that the axis of rotation of the first revolute joint can be aligned vertically independently of the contour of the vehicle component.

In a further preferred embodiment, the device can comprise a flat cuboidal, preferably rectangular holder for multiple retainers, which can be swiveled with the described fixing and transfer assemblies out of a vertical out-of-use position between the driver seat and front passenger seat at the second revolute joint into a horizontal or obliquely inclined in-use position and, at the first revolute joint, into any desired position toward the driver or front seat passenger.

The possibility of swiveling the holder around the first revolute joint and tilting it around the second revolute joint is particularly advantageous for the use of tablet computers and mobile telephones, which in this way can be aligned to the driver or front seat passenger or to persons on the rear seats.

The pivot arm is preferably attached centrally to one of the narrow side walls of the holder, wherein the axis of rotation of the second revolute joint extends preferably parallel with the longitudinal edges of the holder.

In a preferred further embodiment, the holder can be rotated 360° about the second revolute joint and can preferably be fixed in the two vertical out-of-use positions with a manually releasable latching device. A friction brake can also be provided, which fixes the holder in the set positions by means of friction. Alternatively, a latching device can be provided, which also fixes the intermediate position, or just a friction brake without latched positions can be provided.

In a further preferred embodiment, the holder can be operated from both sides. This makes it possible to accommodate multiple retainers for different appliances or other objects, which can be disposed on the one or other wide side of the holder.

By rotating the holder around the second revolute joint, the one or the other wide side of the holder can be rotated upward or into any inclined positions and swiveled around the first rotation bearing toward the driver or front seat passenger.

The possibility of swiveling the holder around the first revolute joint and tilting it around the second revolute joint is particularly advantageous for the use of tablet computers and mobile telephones, which in this way can be aligned steplessly to the driver or front seat passenger or to persons on the rear seats.

In a preferred further embodiment, different receiving and storage shells are constituted on the two wide sides of the holder, for holders, objects, or containers.

One of the two wide sides of the holder can also be constituted as a tabletop, preferably with a circumferential edge.

A receiving space with a receptacle for the pivot arm can be provided on the narrow side of the holder facing toward the support element.

The pivot arm, like the previously described retainer for a tablet computer, could be extendable, so that the distance between the holder and the support element can be varied.

Cavities that are open to the outside or closable with a cover can be disposed laterally from the pivot arm that is inserted preferably centrally in the receiving space, in which, for example, rigid or foldout cup holders are disposed, which can be accessed from one or the other wide side of the holder.

In a further preferred embodiment, retainers for accommodating flat approximately rectangular appliances such as tablet computers or mobile telephones can be disposed on one or both wide sides of the holder.

In preferred further embodiment, the retainers comprise a receiving shell, in which a holder for accommodating the appliance is disposed.

In a preferred embodiment, a receiving shell that extends approximately the width of the holder is provided on one wide side of the holder, in which a retainer for a mobile telephone is disposed.

In a preferred further embodiment, a storage shell for placing smaller objects or for inserting a separate container, for example, for food or waste, is disposed on the holder contiguously with the receiving shell with a holder for a mobile telephone.

Preferably, the receiving shell for a retainer for a mobile telephone and the storage shell are disposed approximately with the same width and together on a wide side of the holder next to each other.

In a further preferred embodiment, a retainer is provided on the other wide side of the holder, with a receiving shell extending approximately the length and width of the holder and having a holder for a tablet computer.

In this way, depending on the position of the holder, the user can either use the mobile telephone and the storage shell or the tablet computer.

In a further preferred embodiment, the retainer for a mobile telephone and the retainer for a tablet computer can be disposed next to each other on a wide side of the holder.

In a further preferred embodiment, the dimensions of the receiving shells are matched to the largest appliance to be accommodated and the holders disposed in the receiving shells are constituted in such a way that they can accommodate mobile telephones and/or tablet computers of different sizes.

For adapting to the different dimensions of the appliances, in a further preferred embodiment the holders comprise two jaws that can move relative to each other, whose distance from each other can be set and fixed to the particular width or length of an appliance inserted in the retainer, for example, with a spindle or with a latching device, so that the two jaws form permanent stops for an appliance inserted between the jaws.

In a preferred further embodiment, one of the jaws is constituted as a U-shaped receiving pocket and the other jaw is provided with a movable retaining clip, which is preloaded with a spring in the direction of the inserted appliance and which covers the latter to such an extent that it is held securely in the retainer in all positions.

In a preferred further embodiment, the receiving pocket is constituted on a side wall of the receiving shell.

In a preferred further embodiment, a lifting device disposed preferably on the holder is provided, which after the retaining clip has been opened, lifts the appliance so far over the edge of the receiving shell that it can be comfortably grasped and removed from the retainer.

In a further preferred embodiment, the side walls of the receiving shells in which the holders are disposed form stops for the appliances inserted in the holders, so that they cannot slip out of the holders laterally during high acceleration such as can occur during an accident.

In a further embodiment, the lateral edges of the receiving shells are so high that the upper edges of the appliances inserted in the retainers are covered, so that in the case of an accident, no contact with the upper edges of the appliances is possible.

In a further preferred embodiment, the retainers for mobile telephones and tablet computers are identical modules with identical components, which can be used in the holders.

In a further preferred embodiment, the holder comprises two housing shells in which the receiving shells and the storage shell are constituted and a holder plate disposed between the two housing shells on which the housing shells are attached.

In a preferred further embodiment, a receptacle for the pivot arm as well as guides for parts of the holders are disposed on the holder plate.

One of the housing shells preferably comprises a receiving shell open to the outside, which extends approximately across the width of the holder, for a holder for a mobile telephone as well as a storage shell adjoining laterally, and the other housing shell preferably comprises a receiving shell open to the outside, which extends approximately along the length and across the width of the holder to provide a holder for a tablet computer.

In a further preferred embodiment, the housing shell provided for accommodating tablet computers of different sizes is constituted with a receiving shell and a holder disposed in a receiving shell in such a way that it forms a retainer provided with a flat rear wall, it being possible to secure said retainer to a vehicle component directly or via a transfer assembly of the embodiments described above.

In a preferred further embodiment, the rear wall of the retainer is provided with a rotation bearing in such a way that the retainer can be rotated between a portrait format position and a landscape format position.

In a further preferred embodiment, a device is provided on the holder or on the retainer for cableless transmission—for example by induction—of electricity for recharging appliances secured in the holders.

In a further preferred embodiment, a container with a receiving shell and a closable hinged cover for accommodating, in particular, food or waste, is provided, which by means of centering and/or disconnectable securing elements—for example clips, magnets, clip-on hooks or the like—can be inserted in and secured so that it can be released from the storage shell disposed on the holder.

Preferably, only the receiving shell is permanently fixed to the holder and the hinged cover is secured by means of a separate releasable fastener such that the hinged cover can also be opened when the receiving shell is securely fixed to the holder. In this way, the container attached to the holder can even be opened and used, for example, as a waste disposal container when the holder is in the vertical out-of-use position.

To clarify, it must be noted that in the described embodiments and configurations of the device in the vehicle, the designations "driver seat" or "front passenger seat" refer to left-hand-drive vehicles in which the driver seat is disposed to the left of the center console as seen from the direction of travel and the front passenger seat is disposed to the right of the center console. These are preferred embodiments and configurations of the device in the vehicle. Of course, the described embodiments and configurations of the device in the vehicle are just as easily realizable in vehicles in which the driver seat is disposed to the right of the center console as seen from the direction of travel and the front passenger seat is disposed to the left of the center console.

Of course, the described embodiments and configurations of the device in the vehicle instead of being implemented between the center console and the front passenger seat can also be implemented between the center console and the driver seat or, for use by passengers, can be implemented on the rear seats of vehicles without departing from the scope of this invention.

Furthermore, of course, the characteristics stated above and to be explained below can be used not only in the respective specified combination but also in other combinations or separately without departing from the scope of this invention.

Further advantages and embodiments of invention result from the description and the attached drawings.

The invention is explained in more detail below by way of preferred embodiments.

BRIEF DESCRIPTION OF THE DRAWING

FIG. 1 shows a perspective view of a first inventive embodiment of the device from the rear with the retainer in the landscape format position.

FIG. 2 shows a perspective view of the device according to the representation in FIG. 1 from the front with a tablet computer inserted in the retainer.

FIG. 3 shows the device according to the representations in FIGS. 1 and 2, secured to a center console of a vehicle in the out-of-use position with the retainer swiveled vertically upward at the second revolute joint in the landscape format position as well as in an in-use position (broken lines) facing toward the front passenger seat.

FIG. 4 shows a perspective view of the device in both positions according to the representation in FIG. 3.

FIG. 5 shows a perspective view of the device in the out-of-use position according to the representations in FIGS. 3 and 4 with the retainer swiveled vertically downward at the second revolute joint in the portrait format position.

FIG. 11 shows a perspective partial view of the device a length-adjustable pivot arm.

FIG. 12 shows a perspective partial view of the device with a plate-shaped pivot arm and a double articulation between the pivot arm and the support element.

FIG. 13 shows a perspective partial view of the device with a height-adjustable pivot arm on the first revolute joint.

FIG. 14 shows a perspective partial view of the device with a manually releasable lock device for holding together the first and second fastening means.

FIG. 15 shows a perspective view of a second inventive embodiment of the device with the retainer in the landscape format position from the rear as well as a vertically aligned receiving bush.

FIG. 16 shows a perspective view of the device according to the representation in FIG. 15 from the front with a tablet computer inserted in the retainer.

FIG. 17 shows a first in-use position of the device according to the representations in FIGS. 15 and 16 with the retainer in a landscape format position above the center console.

FIG. 18 shows the in-use position of the device according to the representation in FIG. 17 with the retainer in a portrait format position.

FIG. 19 shows a second in-use position of the device according to the representations in FIGS. 15 and 16 with the retainer above the footwell of the front seat passenger in a landscape format position facing toward the driver.

FIG. 20 shows the in-use position of the device according to the representation in FIG. 19 with the retainer in a portrait format position.

FIG. 21 shows a third in-use position of the device according to the representations in FIGS. 15 and 16 with the retainer above the footwell of the front seat passenger in a landscape format position facing toward the front seat passenger.

FIG. 22 shows the in-use position of the device according to the representation in FIG. 21 with the retainer in the portrait format position.

FIG. 23 shows the device according to the representations in FIG. 15 and FIG. 16 in an out-of-use position with the retainer pointing vertically downward in the portrait format position next to the side wall of the center console facing toward the front seat passenger.

FIG. 24 shows a view of the device according to the representations in FIG. 15 and FIG. 16 with the retainer in a landscape format position pointing vertically upward.

FIG. 25 shows a perspective view of the device according to the view in FIG. 24 in a folded-up stowed position.

FIG. 29 shows an exploded view of a further embodiment of the first and the second fastening means with a lock device.

FIG. 30 shows a perspective view of the assembled first fastening means and the second fastening means according to the representation in FIG. 29.

FIG. 31 shows a sectional view of the first and second fastening means according to the representation in FIG. 30 in the plugged together and locked position.

FIG. 32 shows a longitudinal view of the first fastening means according to the representation in FIG. 30.

FIG. 33 shows a partially sectional side view of a receiving hush integrated horizontally into a vehicle component according to the representation in FIG. 9, and a plug element disposed so that it swivels on the first revolute joint according to the representation in FIG. 28, which is plugged horizontally into the receiving bush.

FIG. 34 shows a sectional view of a receiving bush applied vertically to the side wall facing toward the front passenger seat of the center console according to the representation in FIG. 8, which is attached to the upper side of the center console.

FIG. 35 shows a perspective view of a variant of a vertically aligned receiving bush to be screwed onto the side wall facing toward the front passenger seat of the center console according to FIG. 8.

FIG. 36 shows a longitudinal view of the receiving bush according to the representation in FIG. 35, screwed onto the side wall of a center console.

FIG. 37 shows a sectional view of the receiving bush according to the representation in FIG. 35, screwed onto the side wall of a center console.

FIG. 38 shows a perspective view of a variant of the device according to representations in FIG. 15 and FIG. 16 with stops for limiting the rotary and swivel movements of the first and second revolute joint in an out-of-use position with a retainer pointing vertically downward in the landscape format position.

FIG. 39 shows a perspective view of the device according to the view in FIG. 38 in a landscape format position facing toward the front seat passenger.

FIG. 40 shows a perspective view of the device according to the view in FIG. 38 in a landscape format: position facing toward the driver.

FIG. 41 shows a view of the device according to the representation in FIG. 38 from above.

FIG. 42 shows a perspective view of the device according to FIG. 38 without the receiving bush from behind.

FIG. 43 shows a partially sectional side view of the device according to the representation in FIG. 41 from behind.

FIG. 44 shows a perspective view of a third inventive embodiment of the device with the retainer in the landscape format position pointing vertically downward.

FIG. 45 shows a side view of the device according to the representation in FIG. 44.

FIG. 46 shows a perspective view of the device according to the representation in FIG. 44 with the retainer in the landscape format position pointing vertically upward from behind.

FIG. 47 shows a side view of the device according to the representation in FIG. 46.

FIG. 48 shows a front view of the device according to the representation in FIG. 42 with the retainer in a position pointing vertically downward with a tablet computer inserted.

FIG. 49 shows a side view of the device according to the representation in FIG. 48.

FIG. 50 shows a front view of the device according to the representation in FIG. 48 with the retainer in a position pointing vertically upward FIG. 51 shows a side view of the device according to the representation in FIG. 50.

FIG. 54 shows a perspective view of a variant of the fastening apparatus according to the representation in FIG. 52 and FIG. 53 from the front.

FIG. 55 shows a perspective view of the fastening apparatus according to the representation in FIG. 54 from behind.

FIG. 56 shows a perspective view of a partial view of the fastening apparatus according to the representation in FIG. 55.

FIG. 57 shows a perspective view of a partial view of the fastening apparatus according to the representation in FIG. 55

FIG. 61 shows a side view of the device according to the representations in FIG. 59 and FIG. 60 with the holder in the vertically aligned out-of-use position.

FIG. 62 shows a longitudinal view of a cup holder in the out-of-use position disposed on the holder.

FIG. 63 shows a longitudinal view of the cup holder according to the representation in FIG. 62 in the unfolded in-use position.

FIG. 80 shows a view of the holder according to the representation in FIG. 78 from above with the retainer without a mobile telephone inserted.

FIG. 81 shows a view of the holder according to the representation in FIG. 79 from above with the retainer without a tablet computer inserted.

DESCRIPTION OF THE PREFERRED EMBODIMENT

Figure 6:
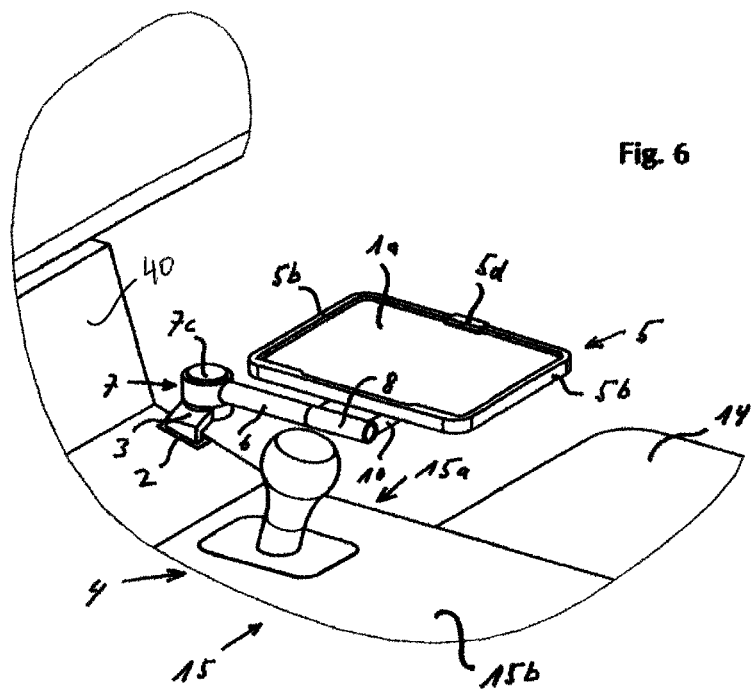
FIG. 6 shows a perspective view of the device according to the representations in FIG. 1 and FIG. 2 with the retainer swiveled at the second revolute joint into a horizontal in-use position.
Figure 7:
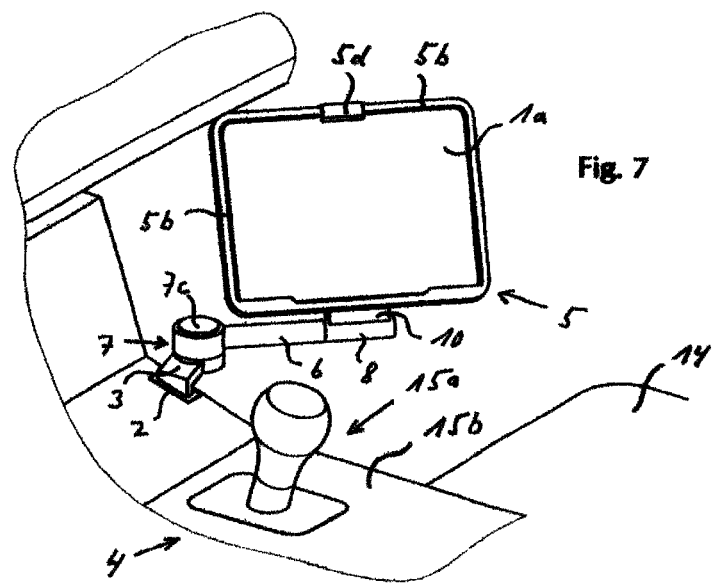
FIG. 7 shows a perspective view of the device according to the representations in FIG. 1 and FIG. 2 with the retainer aligned to the driver in a landscape format position.

FIGS. 1 to 7 and FIG. 10 show a first embodiment of the device. The pivot arm 6 is constituted as a tube and horizontally aligned. The first revolute joint 7 whose axis of rotation z1 is vertically aligned is disposed on the end 6a of pivot arm 6.

Plug element 3 is disposed on the underside of the revolute joint 7, said plug element can be plugged vertically into the plug-in opening 2a of a receiving bush 2 disposed in a vehicle component 15.

The receiving bush 2 is integrated in a cavity of the center console 15 and the plug-in opening 2a is approximately flush with the upper side 15b of the center console 15 (FIG. 3 to FIG. 7)

On the upper side of the revolute joint 7 a release button 7c is fitted, with which a form-fit latching device for pivot arm 6 on revolute joint 7 can be released.

The second revolute joint 8 is disposed on the other end 6b of the pivot arm 6, which is constituted as a tubular continuation of the pivot arm and whose axis of rotation x1 extends parallel with the longitudinal axis of the pivot arm 6.

A plate-shaped support arm 10 is disposed on the second revolute joint 8 transversely to pivot arm 6. The longitudinal axes of pivot arm 6 and support arm 10 are mutually perpendicular.

At the upper end of the support arm 10, the retainer 5 for a tablet computer 1 is connected via the third revolute joint 11 with the support arm 10.

The axis of rotation y of the third revolute joint is perpendicular with respect to the rear wall 5a of the retainer 5 and is disposed in the point of intersection of the diagonals of the rear wall 5a, so that the retainer 5 can be rotated 360° between latched portrait and landscape formats.

In this way, the retainer 5 can be rotated with the first revolute joint 7 about a vertical axis Z1 from a stowed position (FIG. 3 and FIG. 5) into different in-use positions for the driver or front seat passenger (FIG. 3, FIG. 4, FIG. 7), and swiveled with the second revolute joint 8 about a horizontal axis X1 (FIG. 5, FIG. 6, FIG. 7), and rotated with the third rotation bearing 11 between portrait and landscape format (FIG. 5).

Along the edges of the rear wall 5a of retainer 5, a circumferential edging 5b is provided, which laterally supports the tablet computer 1 inserted in the retainer 5 and which covers the edges of the screen 1a.

The tablet computer 1 is inserted from the front (FIG. 2) into the retainer 5. For this, the lower edge of the tablet computer 1 is inserted into the two receiving pockets 5c and the tablet computer 1 is swung into the retainer 5 until the spring-mounted retaining clip 5d clips over the upper edge of the tablet computer 1. To release the tablet computer 1, the retaining clip 5d is pressed outward against the spring resistance parallel with the wide side of the screen 1a.

Figure 8:
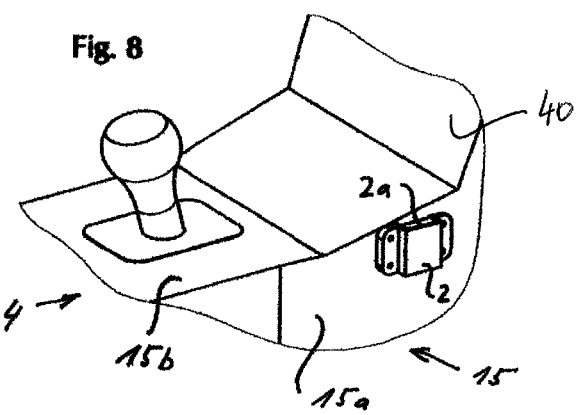
FIG. 8 shows a perspective partial view of a center console in a vehicle with a vertically oriented receiving bush placed on the outer side of the side wall facing toward the front passenger seat of the center console.
Figure 9:
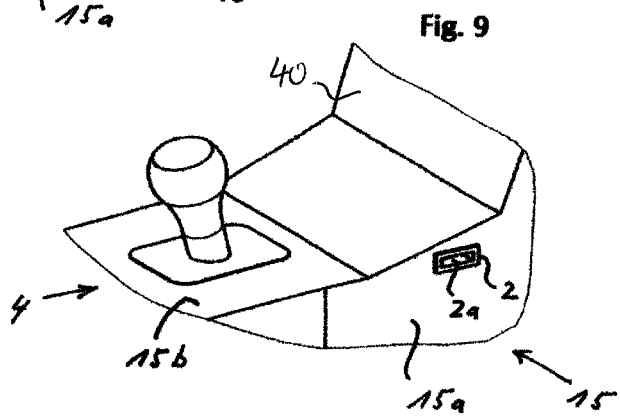
FIG. 9 shows a perspective partial view of a center console in a vehicle with a horizontally oriented receiving bush integrated in a cavity of the center console with a plug-in opening disposed on the outer side of the side wall facing toward the front passenger seat of the center console.

FIG. 8 and FIG. 9 show two variants of the receiving bushes 2, which are disposed on the side wall 15a facing toward the front passenger seat 14 of the center console 15. FIG. 8 shows a receiving bush 2 with a plug-in opening 2a disposed above securely screwed to the side wall 15a of the center console 15, into which the plug element 3 can be plugged in vertically.

FIG. 9 shows a receiving bush 2 integrated into a cavity of the center console 15, whose plug-in opening 2a is disposed on the side wall 15a of the center console 15, so that the plug element 3 can be plugged in horizontally.

Figure 10:
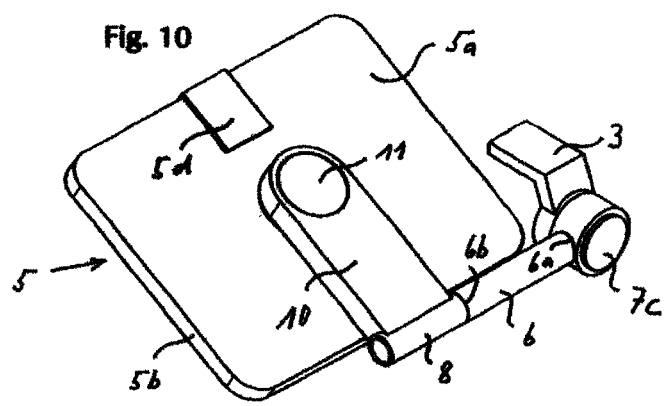
FIG. 10 shows a perspective view of the device according to the representations in FIG. 1 and FIG. 2 with a plug element folded over in a compact stowed position.

For the purposes of compact storage of the device, the retainer 5 and the plug element 3 can be turned toward each other about the second revolute joint 8 until the retainer 5 and the plug element 3 lie above or next to each other (FIG. 10).

FIGS. 11 to 13 show variants of the transfer assembly.

Wherein FIG. 11 shows a pivot arm 6 that can be adjusted longitudinally. Instead of a fixed tube 6, two tube sections 6' and 6" are slotted telescopically into each other and can be fixed at the desired extension length (not shown).

FIG. 12 shows a plate-shaped pivot arm 6, on which, instead of the second revolute joint 8, a double articulation 12 is provided, via which the support arm 10 is connected to the pivot arm 6. The double articulation 12 comprises the rotation bearing 12a, which is connected to the pivot arm 6, and the swivel bearing 12b, which is connected to the support arm 10. The rotation bearing 12 rotates about the axis of rotation z2, which extends vertically parallel with the axis of rotation z1 of the first revolute joint 7, and the swivel bearing 12b rotates about the axis of rotation x2, which extends perpendicular with respect to the axis of rotation z2 of the rotation bearing 12a.

FIG. 13 shows a height-adjustable support element 7d. At the upper end of the plug element 3, a vertically aligned bearing pin 7a is disposed, which forms the revolute joint 7 with a bearing sleeve 7b disposed at the end 6a of the pivot arm 6. By axial displacement of the bearing sleeve 7b on the bearing pin 7a, the height of the plane in which the pivot arm 6 rotates can be changed. The bearing sleeve 7b can be fixed in the desired position on the bearing pin 7a by means of friction or a releasable latching device.

FIG. 14 shows a lock device 9a, 9b, 9c, with which the plug element 3 can be releasably locked in the receiving bush 2. Here, a spring tab 9c is provided on the plug element 3, which is equipped with a latching hook 9a, which snaps into a recess 9b attached to the side wall of the receiving bush 2 when the plug element is fully plugged into the receiving bush. In order to release the lock device 9a, 9b, 9c, the spring tab 9c can be pressed against the first revolute joint 7 until the latching hook 9a releases and the plug element 3 can be pulled out of the receiving bush 2.

The plug-in opening 2a of the receiving bush 2 is closed with a hinged cover 2b so that the receiving bush 2 cannot become dirty. When the plug element 3 is plugged in, the hinged cover 2b is swiveled to the side into a cavity so that the plug element can be plugged into the receiving bush 2.

FIGS. 15 to 25 show a second embodiment of the device. On the first revolute joint 17 disposed on the plug element 130, a support element 17d extending vertically upward is provided, on whose upper end the pivot arm 16 with the second revolute joint 18 is disposed at right angles. On the second revolute joint 18, the support arm 110 is disposed on whose upper end the retainer 150 with the third revolute joint 111 is rotatably attached.

If the retainer 150, the support arm 110, the pivot arm 16 with the second revolute joint 18, and the support element 17d lie in mutually parallel planes and the retainer 150 is rotated into landscape format, the outer contour of the support element 17d is approximately flush with the short side edge 150b' of the retainer 150 and the outer contour of the pivot arm 16 with the second revolute joint 18 is approximately flush with the long side edge 150b" of the retainer 150 (FIG. 24).

In the folded-up stowed position, the support arm 110, the pivot arm 16 with the second revolute joint 18, the support element 17d and the plug element 130 are aligned approximately parallel with the lateral edges 150b' and 150b" within the outside contours of the retainer 150 (FIG. 25).

The height of the support element 17d is dimensioned so that the rotation plane of the pivot arm 16 is so high that the retainer 150 can be swiveled both over the legs of the front seat passenger (FIG. 21) and over the knob of the gear lever 15c (FIG. 18) toward the driver.

In FIGS. 17 to 20, different in-use positions of the retainer 150 are shown for use by the driver and in FIGS. 21 and 22 for use by the front seat passenger. FIGS. 17, 19, and 21 show the retainer 150 in landscape format. FIGS. 18, 20, and 22 show the retainer 150 in portrait format.

FIG. 23 shows the retainer 150 in an out-of-use position in portrait format aligned parallel with the side wall 15a of the center console 15.

In FIGS. 17 to 23, the various positions of the first revolute joint 17, the support element 17d, the pivot arm 16, the second revolute joint 18, the support arm 110, and the third revolute joint 111 are represented by dashed lines.

The positions of the retainer 150 shown in FIGS. 17 to 23 are randomly selected and intermediate positions are dependent on the rotation steps of a latching device. If friction hinges are used, any intermediate position is possible.

Figure 26:
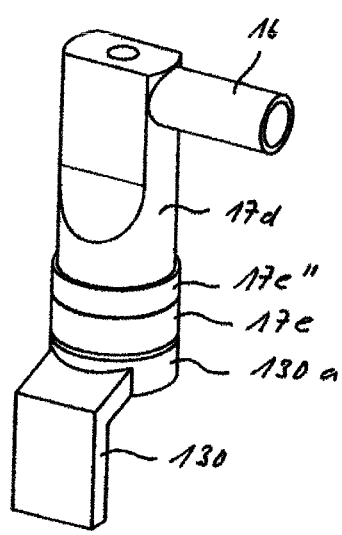
FIG. 26 shows a perspective partial view of the device according to the representations in FIG. 15 to FIG. 25 with an adjustment device for aligning the axis of rotation of the first revolute joint in the vertical direction.
Figure 27:
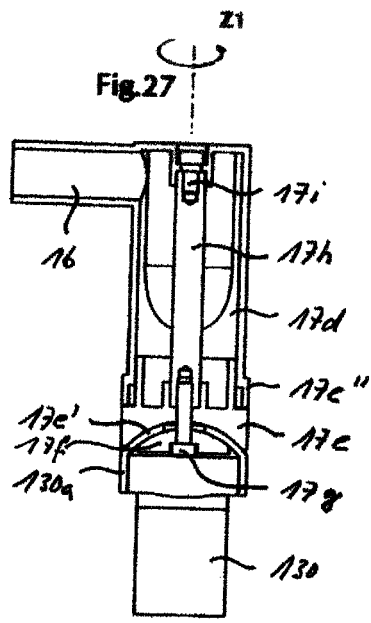
FIG. 27 shows a longitudinal view of the partial view of the device according to FIG. 26.

FIG. 26 and FIG. 27 show an adjustment device for the vertical alignment of axis of rotation z1 of the first revolute joint 17.

The contours of the side walls 15a of center consoles 15 on which the receiving bush 120 is attached (FIG. 8) often do not extend vertically. Furthermore, a subsequently fitted receiving bush 2, 120 will often be mounted inclined if a spirit level is not used, so that the rotation plane of the pivot arm 6, 16 does not extend horizontally.

This can be compensated for by means of a manually settable spherical joint 130a, 17e, 17e', 17f, 17g, disposed between the plug element 130 and the first revolute joint 17.

A swivel bearing 17e is disposed at the lower end of the support element 17d, same swivel bearing being connected via the rotation bearing 17e" with the support element 17d to form the first revolute joint 7,17.

At the upper end of the plug element 130, a spherical head cover 130a is fitted, which together with the ball cup 17e' disposed on the underside of the swivel bearing 17e forms the spherical joint 130a, 17e'.

In the center of the support element 17d a spacer sleeve 17h is disposed, which rests on the swivel bearing 17e and is provided with internal threads at both ends.

On the inner side of the spherical head cover 130a, a pressure cap 17f is provided, which is screwed into the lower thread of the spacer sleeve 17h using the clamping bolt 17g and preloads the spherical head cover 130a against the ball cup 17e' on the swivel bearing 17e.

By loosening the clamping bolt 17g, the support element 17d can be aligned vertically and fixed in this position by tightening the clamping bolt 17g.

The support element 17d is secured against axial displacement by means of the flange bolt 17i, which is screwed into the upper thread of the spacer sleeve 17h, but can still be rotated with the pivot arm 16.

Figure 28:
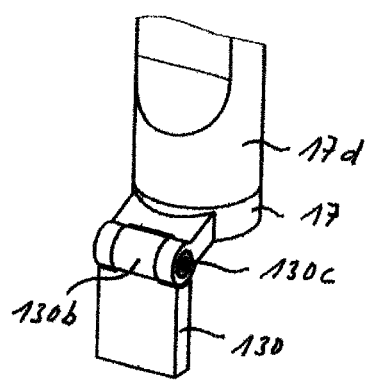
FIG. 28 shows in a perspective view a variant of the connection of the plug element via a swivel articulation to the first revolute joint.

FIG. 28 shows a simplified variant of an adjustment device for the vertical alignment of axis of rotation z1 of the first revolute joint 17 in one axis. The revolute joint 17 is disposed at the lower end of the support element 17d, same revolute joint being connected via the swivel articulation 130b with the plug element 130. By loosening the fastening screw 130c, the support element 17d can be aligned along one axis and secured by tightening the fastening screw 130b. For the purposes of space-saving storage of the device, the plug element 130 can be folded up and placed against the support element 17d.

FIG. 29 to 31 show a further embodiment of the first and second fastening means 120, 130 with a lock device 19a, 19a', 19a", 19b.

The first fastening means 120 comprises a basic plate 120b, which is subdivided into strips A to F by V-shaped tapered channels disposed in parallel (FIG. 30 and FIG. 31). The tapered channels perform the function of integral hinges, so that the basic plate 120b can also be fastened to curved surfaces, such as, for example, a side wall 15a of a center console 15 (FIG. 8) either with adhesive or screws. Screw holes 120b''' are provided on the outside strips A and F for screwing tight.

On each of the two outer strips A and F, two domes 120b" are also provided on which the interposed plate 120c, which surrounds the receiving bush 120, is fastened on fixing arms 120c' with screws 120c".

Between the basic plate 120b and the receiving bush 120, an empty space is provided (FIG. 32) in which the basic plate 120b can become arched as it is fastened to curved surfaces.

The lock device 19a, 19a', 19a" is also disposed on the interposed plate 120c. It comprises the L-shaped latching hook 19a with the release button 19a', which is supported with the swivel axis 19a" disposed so that it rotates in a cantilever disposed on the wide side of the receiving bush 120 and preloaded with a spring (not shown) in such a way that the latching hook 19a on the plug element 130e snaps into the recess 19b and the plug element 130 is locked in the receiving bush 120 (FIG. 31). Pressing down the release button 19a' releases the lock and the plug element 130 can be pulled out of the receiving bush 120.

A cover 120d is provided to cover the interposed plate 120c.

FIG. 33 shows a support element 17d on whose lower end the first rotation bearing 17 is disposed. The plug element 130 is connected via the swivel articulation 130b to the first rotation bearing 17 and can be secured in the desired positions by means of the fastening screw 130c. A horizontal position is illustrated in which the plug element is plugged into a horizontally aligned receiving bush 2 whose plug-in opening 2a is disposed on the outside wall 15a of a center console 15 (FIG. 9).

FIG. 34 shows a further variant of a receiving bush 2, which is disposed on the side wall 15a of a center console 15 and secured with the fixing arm 2e and the fixing screw 2d on the upper side 15b of the center console 15.

FIG. 35 to FIG. 37 show a further variant of a receiving bush 2 vertically aligned with the side wall 15a of a center console 15, the receiving bush 2 having a plug-in opening 2a disposed at the top. Lateral fixing arms 2e', 2e" are attached to the narrow side walls of receiving bush 2 and are equipped with oblong holes 2f', 2f" for the blind rivet screws 2c, with which the receiving bush 2 is secured on the side wall 15a with blind rivet nuts 2h (FIG. 37).

A recess 2g is provided on the wide side of the receiving bush 2 that faces the side wall 15a, so that the receiving bush 2 can also be screwed tightly onto curved side walls 15a without tension, for which the oblong holes 2f', 2f" are also provided, in which the screws 2c can adopt a slightly inclined position.

FIG. 38 to FIG. 43 show a variant of the device, which differs from the embodiment shown in FIGS. 15 and 16 by the fact that a stop cam 171 disposed on the first revolute joint 17 and a stop slit 17k disposed horizontally on the outside wall of the support element 17d, in which the stop cam 171 rotates, constitute stops, which limit the angle of rotation of the support element 17d and therefore of the pivot arm 16, of the support arm 110, and of the retainer 150 to approximately 120° to 135°, so that the retainer 150 can be rotated approximately 120° to 135° from the out-of-use position only in the clockwise direction toward the center console 15 (FIG. 42)

By the same principle, a stop cam 18*a* is provided on the second revolute joint 18 and a stop recess 16*c* is provided on the pivot arm 16, which limit the swivel angle of the second revolute joint 18 and therefore of the support arm 110 and of the retainer 150 to approx. 90°, so that the retainer 150 can be swiveled out of an out-of-use position facing vertically downward approximately 90° into a horizontal in-use position (FIG. 42).

With these limitations to the rotary and swivel movements of the retainer 150, it can be ensured that the tablet computer 1 can be aligned from the out-of-use position facing vertically downward (FIG. 38) into inclined in-use positions both for the front seat passenger (FIG. 39) and for the driver (FIG. 40) without swiveling the retainer 150 so far into the front seat passenger space that in some vehicles, obstacles to deployment of the front seat passenger airbag could occur.

In this embodiment, the retainer 150 moves between the out-of-use position and the in-use positions for the driver and front seat passenger essentially above the center console 15 so that obstacles to the front seat passenger also do not occur. Furthermore, this configuration permits very simple and fast adjustment of the retainer 150.

FIGS. 44 to 47 show a further especially compact and stable embodiment of the device. The pivot arm 160 is disposed at the upper end of the support element 170*d* and the second rotation bearing 180 is supported in a forked shaped on the pivot arm 160, wherein the support element 170*d* and the support arm 110*a* are approximately flush. The rotation of the retainer 150 about the first revolute joint 170 describes a circular arc with a smaller radius, which can be advantageous in the restricted space conditions in a vehicle. FIGS. 44 and 45 show the device with the retainer 150 facing vertically downward, and FIGS. 46 and 47 show the device with the retainer 150 facing vertically upward.

FIGS. 48 to 51 show the device according to the representations in FIGS. 38 to 43 with the configuration of the support element 17*d* with the first revolute joint 17 and the plug element 130, the pivot arm 16 with the second revolute joint 18 and the support arm 110 with the third rotation bearing 111 with respect to the longitudinal edges 151*a*, 151*c* and the cross edges 151*b*, 151*d* of the retainer 150, with the retainer in the position facing vertically downward (FIGS. 48 and 49) and facing vertically upward (FIGS. 50 and 51).

Figure 52:
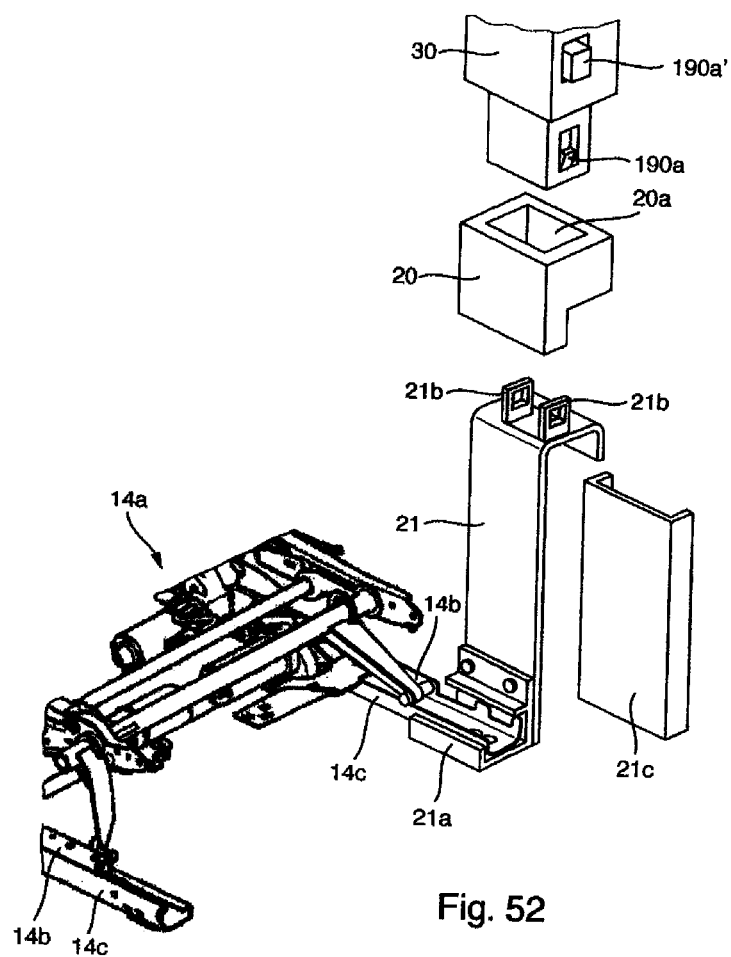
FIG. 52 shows an exploded view of an alternative fastening apparatus disposed on a guide rail of a vehicle seat.
Figure 53:
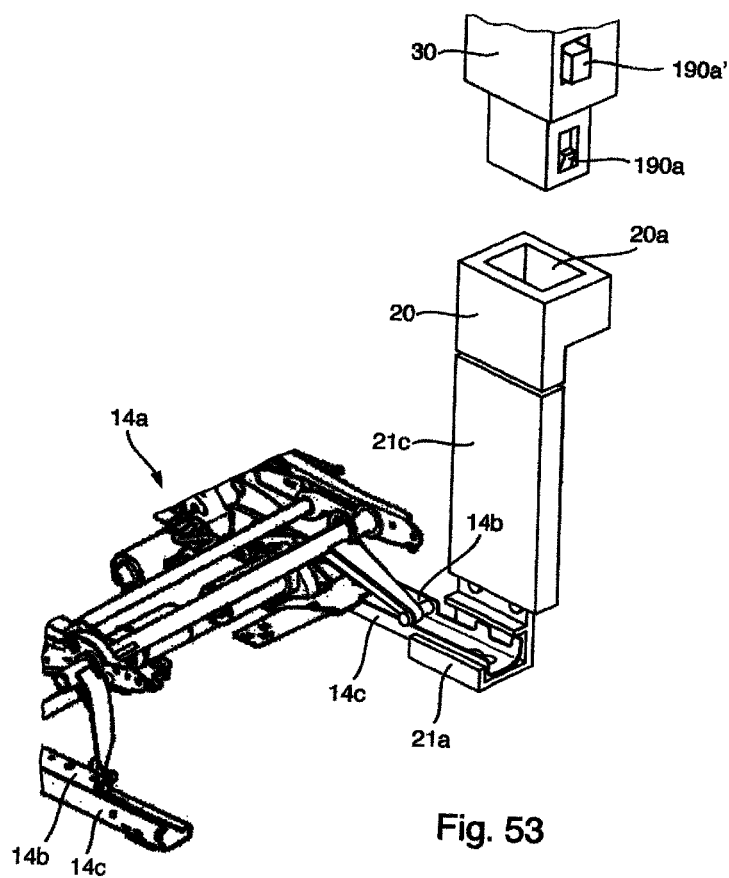
FIG. 53 shows a perspective view of the fastening apparatus according to the representation in FIG. 52 in an assembled condition with the plug element above the receiving bush.
Figure 58:
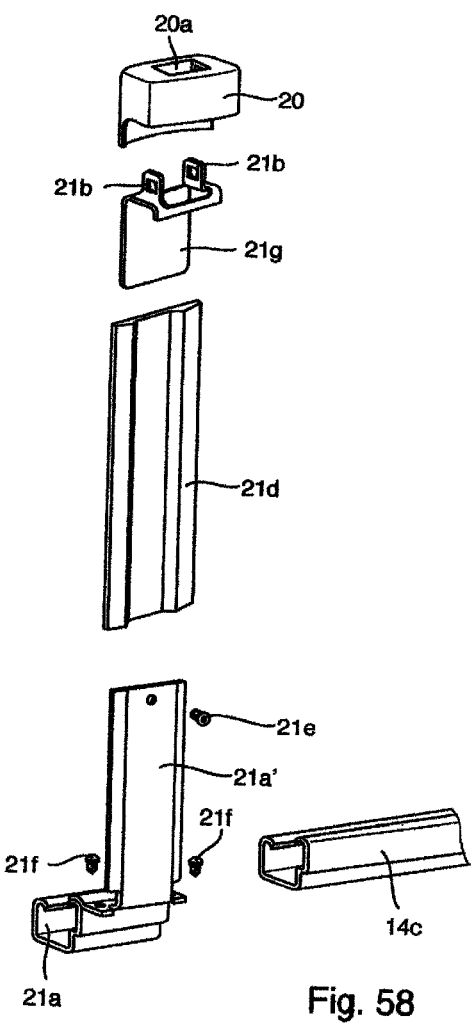
FIG. 58 shows an exploded view of the fastening apparatus according to the representations in FIGS. 54 to 57.

FIGS. 52 and 53 show an alternative fastening apparatus, with which the device can be secured in a vehicle. The fastening apparatus comprises a support 21 disposed approximately vertically between the center console and the vehicle seat (not shown), which is fastened with a screw connection, so that it can be released, at the lower end with a fastening element 21*a* at the front end of a guide rail 14*c* disposed on the vehicle floor, in which the seat frame 14*a* of the vehicle seat is movably supported on a slide 14*b*.

The support 21 is made of a metal sheet and secured at the lower end with a screw connection on fastening element 21*a*, which grips underneath and around the guide rail 14*c* in a U shape. At its upper end, support 21 is folded over in a U shape. At its top side, two tabs are notched out of the sheet, which form the mating hooks 21*b* for the latching hooks 190*a* of the plug element 30.

The receiving bush 20 is made of plastic and secured with a screw connection (not shown) at the upper end of the support 21. Support 21 is covered by a cover 21*c*.

The plug element 20 can be inserted from above into the receiving bush 20 until the latching hooks 190*a* latch tight into the mating hook 21*b*. The locking is released by pressing the release buttons 190*a*' on plug element 30.

FIGS. 54 to 58 show a further variant of the fastening apparatus. The support 21 comprises a sectional rail 21*d* of C-shaped cross section and a wide side, which is curved in the lateral direction so that a high degree of stability of the support is achieved and damage to the upholstery of the vehicle seat when the seat is moved is prevented.

The sectional rail is open at both ends, so that at the upper end, the locking plate 21*g* with the two unlatched mating hooks 21*b* is inserted into the rail and can be pressed into the rail.

The fastening element 21*a* is constituted as a C-shaped sheet metal part and closes round the guide rail 14*c* from below. To assemble, the fastening element 21*a* can be slotted from the front onto the free-standing end of the guide rail 14*c*.

On the side pointing toward the center console 15, the fastening element 21*a* is folded over at right-angles toward the center console 15 and forms a horizontally aligned platform on which a foot 21*a*" bent over at right angles is secured at the lower end of a guide rail 21*a*' with two clamping bolts 21*f*.

The foot 21*a*" protrudes beyond the platform of the fastening element 21*a* and presses onto the top side of the guide rail 14*c* so that when the clamping bolts 21*f* are tightened, the fastening element 21*a* is securely clamped to the guide rail 14.

The guide rail 21*a*' juts vertically upward and can be inserted into the lower opening of the sectional rail 21*d*. The sectional rail 21*d* is guided linearly movably along the guide rail 21*a*', so that the desired height of the receiving bush can be set and secured with the fastening screw 21*e*.

FIGS. 59 to 68 show a further embodiment of the device with a plate-shaped rectangular holder 300. The basic structure of the support element 270*d* with the first revolute joint 270 and the plug element 230 with the two latching hooks 290*a* and the two release buttons 290*a*' disposed at the lower end and the pivot arm 260 disposed at the upper end correspond to the previous concepts described above, which are hereby referred to. As in these described concepts, the axes of rotation of the first revolute joint 270 and of the second revolute joint 280 are mutually perpendicular.

A holder 300 is disposed on pivot arm 260, wherein the axis of rotation of the second revolute joint 280 extends parallel with the longitudinal edge 300',300''' of the holder 300 and centrally between them.

On the end of the holder 300 facing toward the support element 270*d*, a receiving space 310 is provided in which the pivot arm 260 is disposed centrally.

The second revolute joint 280 can be disposed between the pivot arm 260 and the support element 270*d* or between the pivot arm 260 and the holder 300 or inside a two-part pivot arm 260.

Figure 59:
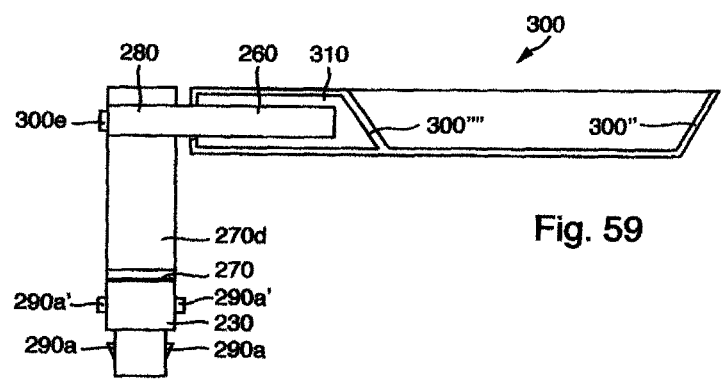
FIG. 59 shows a partially sectional side view of an embodiment of the device with a plate-shaped holder in a horizontally aligned in-use orientation.
Figure 60:
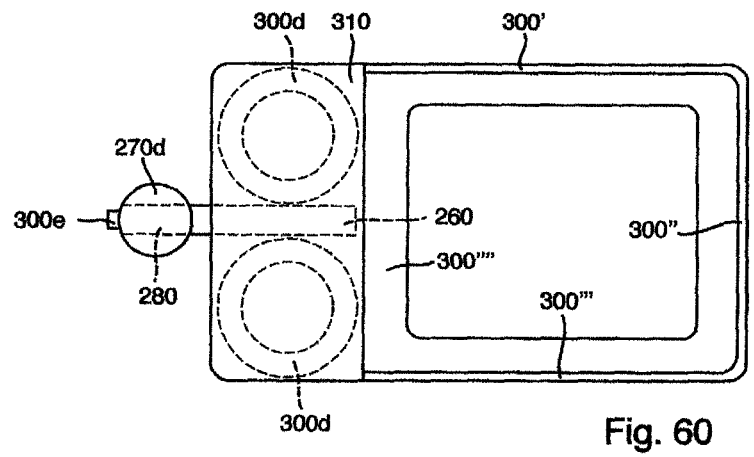
FIG. 60 shows the device according to the representation FIG. 59.

The holder 300 can be rotated through 360° around the second revolute joint 280, wherein a latching device (not shown) is provided, with which the holder 300 is blocked in the vertical out-out-of-use positions (FIG. 61) and in the horizontal in-use position (FIGS. 59 and 60). A release button 300*e* is provided to release the lock.

In the receiving space 310, cavities are provided on both sides of the pivot arm 260, in each of which a foldout cup holder is disposed. The cup holders comprise a cover 300*c* that can be folded out by 90° via a first joint 310*c*' and connected to the holder 300 as well as a support ring 300*d* that can be folded out by 90° via a second joint 300*d'* and connected to the cover 300*c*, wherein the axes of rotation of the first revolute joint 310*c'* and of the second revolute joint 300*d'* are aligned in parallel.

When the cup holders are not in use, the covers 300*c* and the support rings 300*d* lie parallel with the wide side of the holder 300, folded onto each other inside the cavities of the receiving space 310 (FIG. 62).

In the in-use position, the covers 300*c* are perpendicular with respect to the wide side of the holder 300 facing upward and the support rings 300*d* are parallel with the wide side of the holder 300 and aligned at a distance from the latter (FIG. 63).

Adjoining the receiving space 310 is the holder, which is constituted as a shell shape and provided with a circumferential edge 300', 300'', 300''', 300'''' inclined outward, whose upper edges are flush with the closed covers 300*c* (FIG. 59).

Figure 64:
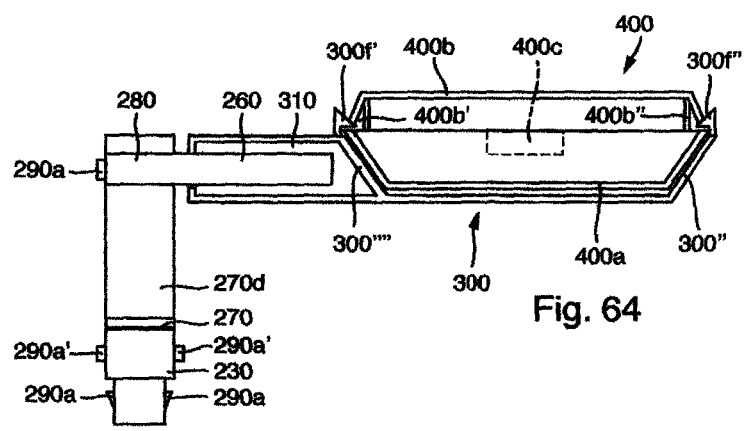
FIG. 64 shows a partially sectional side view of the device according to the representation in FIG. 59 with a container inserted in and secured to the holder with retaining clips.
Figure 65:
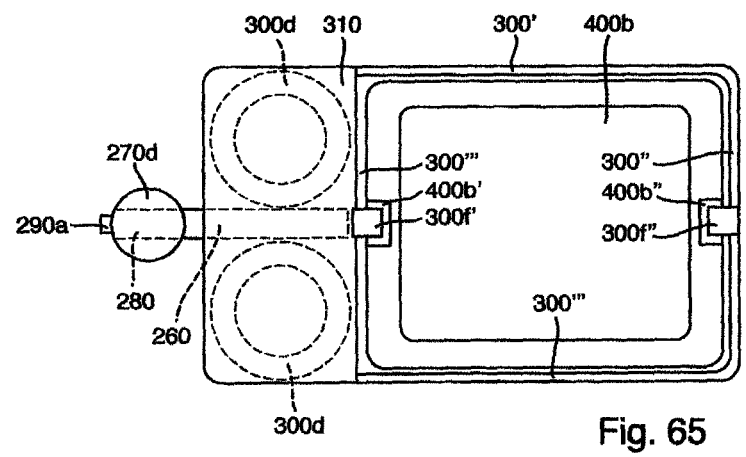
FIG. 65 shows the device according to the representation FIG. 64.

On the side walls 300'' and 300'''' of the holder 300 retaining clips 300*f'*, 300*f'''* are disposed centrally, with which a container 400 with a receiving shell 400*a* and a cover 400*b* linked to the receiving shell 400*a* with an integral hinge can be releasably fastened to the holder 300 (FIGS. 64 and 65).

The outside contour of the receiving shell 400*a* has a complementary shape to the shell-shaped internal form of the holder 300, 300', 300'', 300''', 300'''' so that the container 400 is supported laterally when it is fastened to holder 300 with the retaining clips 300*f'*, 300*f'''*.

The cover 400*b* can be releasably locked by means of a lock clip 400*c* with the receiving shell 400*a*.

Centrally disposed recesses 400*b'*, 400*b''* are provided along the narrow sides of the cover 400*b*, so that the retaining clips 300*f'*, 300*f'''* merely retain the receiving shell 400*a* on the holder 300, the cover 400*b* of the container 400 can however be opened and, by means of the lock clip 400, locked separately with the receiving shell 400*a*.

To remove the container 400 from the holder 300, the retaining clips 300*f'*,300*f'''* can be moved outward until the container 400 can be removed from the holder 300.

Figure 66:
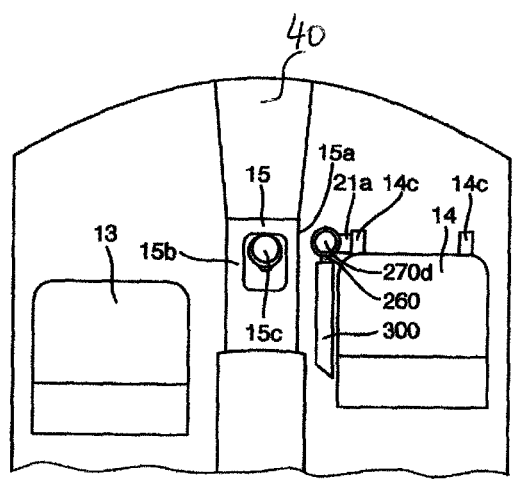
FIG. 66 shows the device installed in a vehicle according to the representations in FIGS. 59 to 63 in the out-of-use position in a view from above.

FIG. 66 shows the device in the out-of-use position secured with the fastening element 21*a* to the front end of the guide rail 14*c* disposed near the center console 15 for the front passenger seat 14, as shown and described in FIGS. 52 to 58.

In the vertical out-of-use position, the holder 300 can be rotated around the second revolute joint 280 through 90° into a horizontal in-use position and swiveled 180° around the first revolute joint 270 toward the driver seat 13 or the front passenger seat 14.

Figure 67:
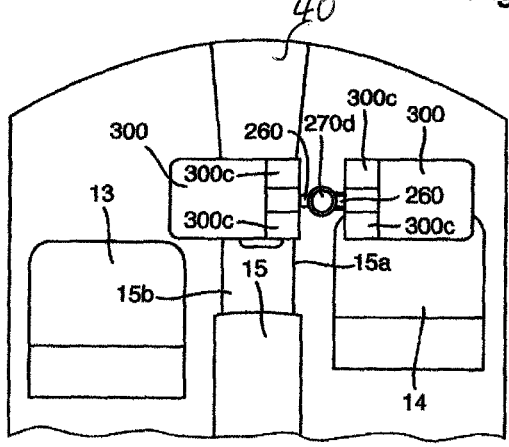
FIG. 67 shows the device according to the representation in FIG. 66 in two in-use positions in a view from above.

FIG. 67 shows two in-use positions of the holder 300, above the center console 15 for use by the driver and above the front passenger seat 14 for use by the front seat passenger.

When not in use, the holder 300 can be separated from the receiving bush 20 by releasing the latching hooks 290*a* with the release buttons 290*a'* (FIG. 53) and the support element 270*d* for space-saving storage on the second revolute joint 280 can be aligned and locked parallel with the wide sides of the holder 300 (FIG. 61).

Figure 68:
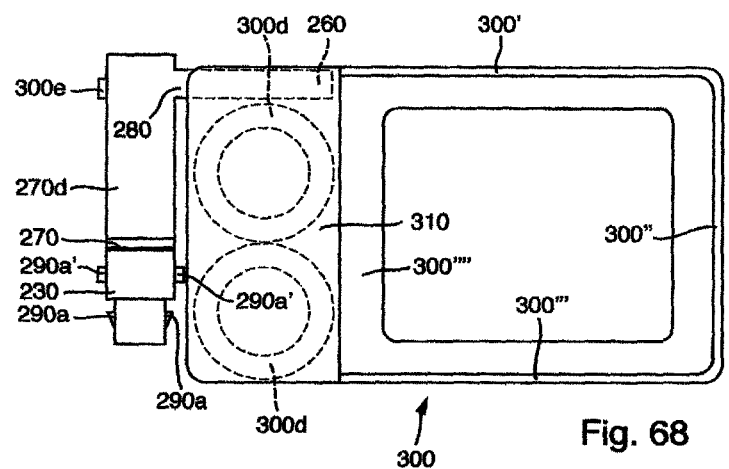
FIG. 68 shows a side view of a variant of the device according to the representations in FIGS. 59 to 67 with an asymmetrical configuration of the pivot arm in the vicinity of a longitudinal edge of the holder with the holder in the vertically aligned out-out-of-use position according to the representation in FIG. 61

FIG. 68 shows an alternative configuration of the pivot arm 260 on holder 300. Instead of being disposed centrally between the two cup holders 300*d*, the pivot arm 260 is disposed near the outside edge 300' in the receiving space 310. Otherwise, the embodiment corresponds to the representations in FIGS. 59 to 67 and is labeled with identical reference symbols.

Figure 69:
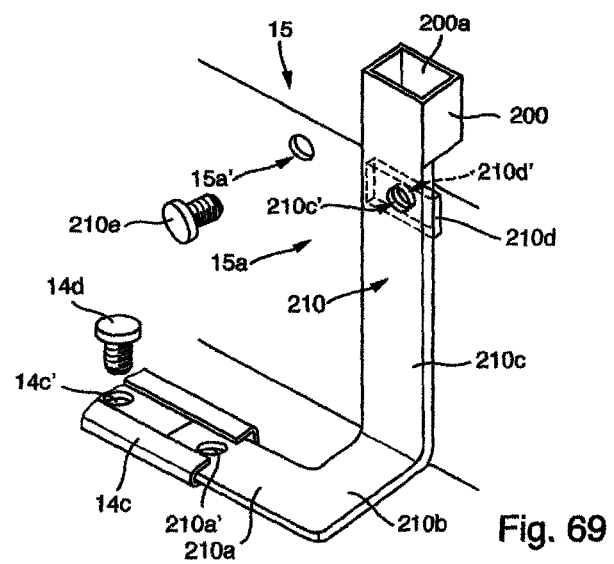
FIG. 69 shows a variant of the fastening apparatus according to the representations in FIGS. 52 to 58.

FIG. 69 shows a further variant of the fastening apparatus. The support 210 is manufactured in one piece from a punched and bent part of robust metal sheet and comprises an L-shaped fastening element with the sections 210*a*, 210*b* as well as a support section 210*c* at the end of section 210*b* bent upward approximately at a right angle, wherein the wide sides of the sections 210*a*, 210*b* extend approximately parallel with the vehicle floor and the wide side of the support section 210*c* extends approximately parallel with the side wall 15*a* of the center console 15. The receiving bush 200 open at the top is secured to the top end of the support section 210*c*.

The free end of section 210*a* is inserted from the front into the C-shaped guide rail 14*c* of the front passenger seat 14 until screw hole 210*a'* disposed on section 210*a* and screw hole 14*c'* disposed on guide rail 14*c* lie congruently one above the other. Support 210 and guide rail 14*c* are then jointly screwed securely onto the vehicle floor using screw 14*d* that already exists in the vehicle for securing the guide rail 14*c*, without additional components being required.

Support section 210*c* is preloaded with slight preloading against the side wall 15*a* of center console 15 and is supported against side wall 15*a* of center console 15 with the rubber pad disposed at the upper end so that vibrations of the support 210 and devices 1 secured to it are prevented.

To improve the stability of support 210, a screw 210*e* is provided with which the support section 210*c* can be securely screwed at the level of the rubber pad 210*d* on the side wall 15*a* of the center console 15.

For this, corresponding boreholes 210*c'*, 210*d'*, 15*a'* are provided on the support section 210*c* as well as on rubber pad 210*d* as well as on side wall 15*a*, which lie congruently one above the other when support 210 is inserted in guide rail 14*c* and has been secured with screw 14*d*.

Figure 70:
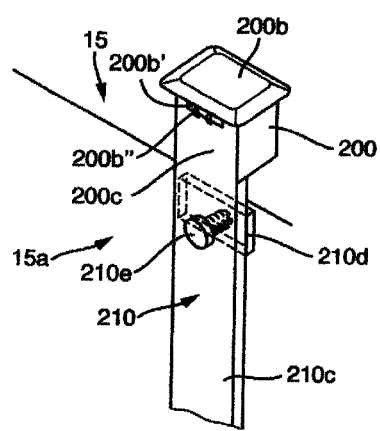
FIG. 70 shows a perspective view of the receiving bush disposed at the upper end of the support according to the representation in FIG. 69, with a hinged cover for closing the plug-in opening of the receiving bush in the closed position.
Figure 71:
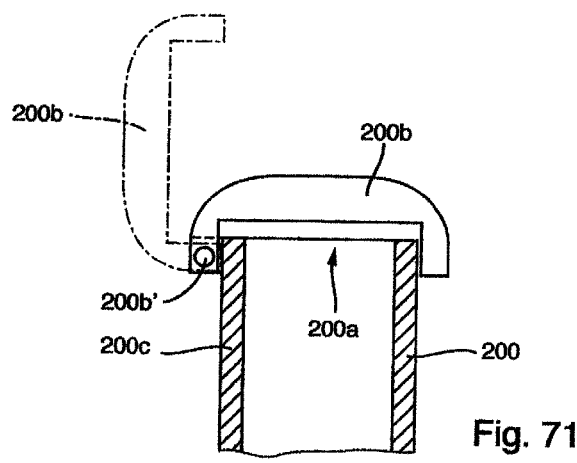
FIG. 71 shows a sectional view of the receiving bush according to the representation in FIG. 70 with the hinged cover in the open and closed position.
Figure 72:
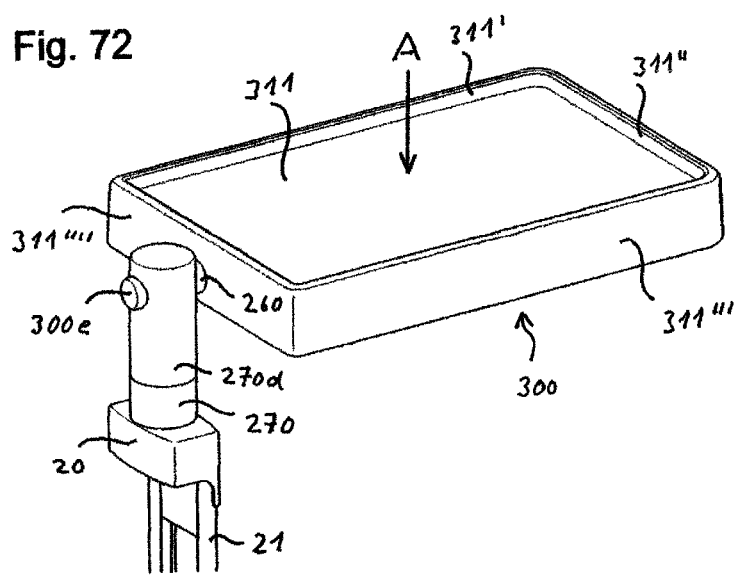
FIG. 72 shows a perspective view of a further embodiment of the device with a plate-shaped holder, which can be rotated about the second revolute joint and used on both sides, in a horizontal in-use position facing toward the front seat passenger.
Figure 73:
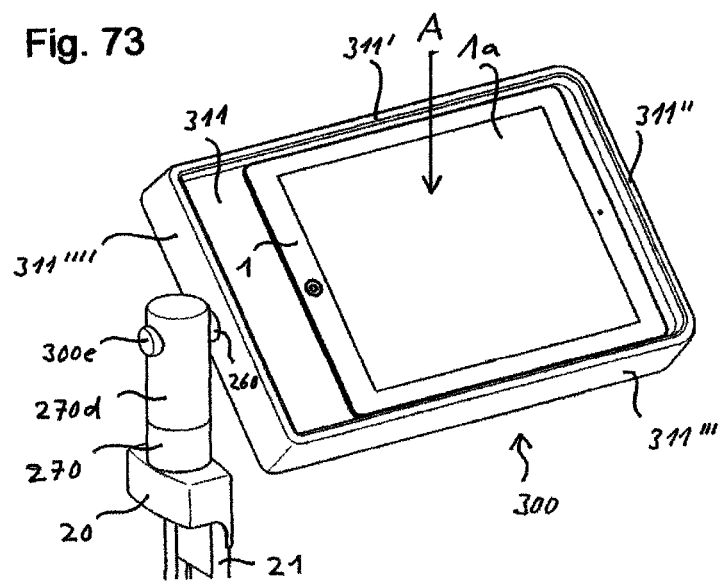
FIG. 73 shows a perspective view of the holder according to the representation in FIG. 72 with a tablet computer in an inclined in-use position.

FIGS. 70 and 71 show a hinged cover 200*b* for closing the plug-in opening 20*a*, 200*a* of receiving bush 20, 200 in the closed position.

Hinged cover 200*b* is preferably hinged with a joint 200*b'* with a horizontally aligned axis of rotation on the wide side wall 200*c* facing toward the front passenger seat 14 of the receiving bush 200, and preloaded into the closed position, in which it covers the receiving bush 200, with the leg spring 200*b''*. To avoid injury to passengers in an accident, the hinged cover 200*b* is preferably provided with large safety radii all the way round its outer side.

When plug element 30, 230 is inserted into receiving bush 200, hinged cover 200*b* is pressed against the wide side of plug element 30, 230 with leg spring 200*b''*, wherein the release buttons 190*a'*, 290*a'* remain freely accessible in order to be able to release lock 190*a*, 290*a* (FIG. 53).

When plug element 30, 230 is pulled out of receiving bush 200, the spring-loaded hinged cover 200*b* automatically closes the plug-in opening 20*a*, 200*a* of the receiving bush 20, 200, so that it is protected from becoming dirty.

FIGS. 72 to 77 show a further embodiment of the device with a holder 300, which is usable from both sides, disposed to rotate 360° about the second revolute joint 280. Herein, the one wide side of the holder (labeled A) is constituted as a tabletop and the other wide side of the holder (labeled B) is equipped with two cup holders and a storage shell.

The embodiment of side B in principle corresponds to the description of the representations in FIG. 59 to FIG. 67, which are hereby referred to. For that reason, the corresponding reference symbols from FIG. 59 to FIG. 67 are used.

Figure 77:
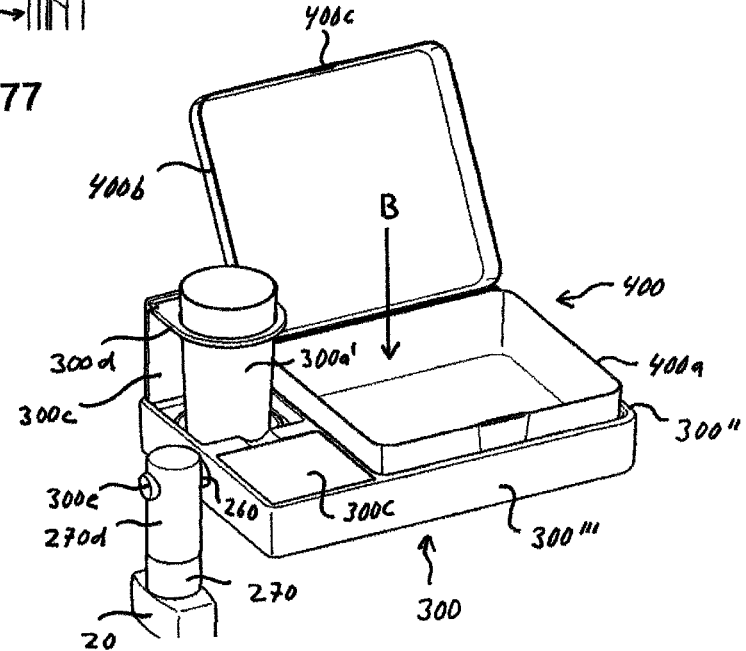
FIG. 77 shows a perspective view of the holder according to the representation in FIG. 76 with a folded open support ring of the cup holder and a beaker inserted in the support ring as well as the open cover of the container.
Figure 78:
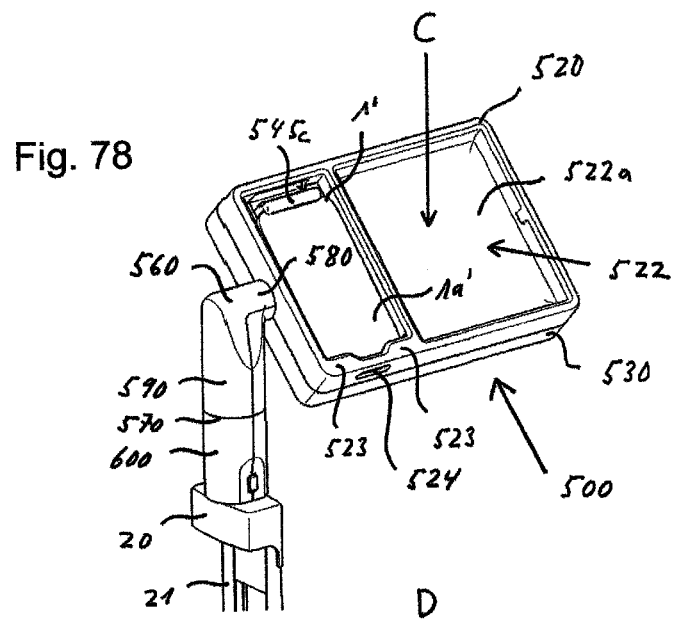
FIG. 78 shows a perspective view of a further embodiment of the device with a retainer disposed on one side of the holder for a mobile telephone and a shell-shaped recess in an inclined in-use position.
Figure 79:
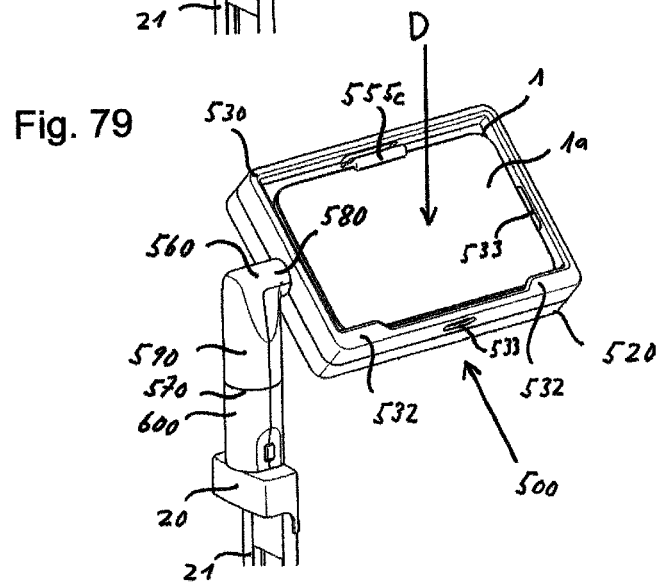
FIG. 79 shows a perspective view of the holder rotated through 180° according to the representation in FIG. 78 with a retainer disposed on the rear side for a tablet computer.

Additionally, in FIG. 77 to FIG. 79, beaker 300a' in the support rings 300d of the cup holder as well as a combined finger cavity 300c' for grasping the covers 300c has been added.

Figure 74:
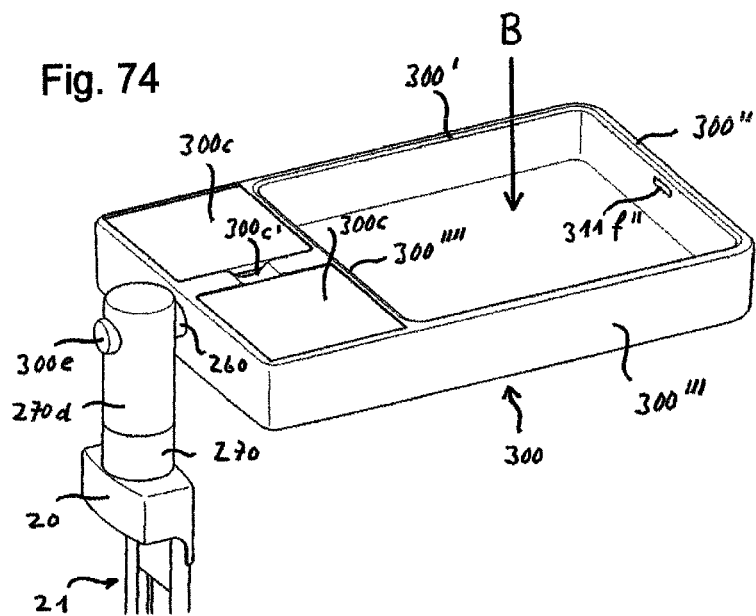
FIG. 74 shows a perspective view of the holder according to the representation in FIG. 72, rotated through 180° in a horizontal in-use position.
Figure 75:
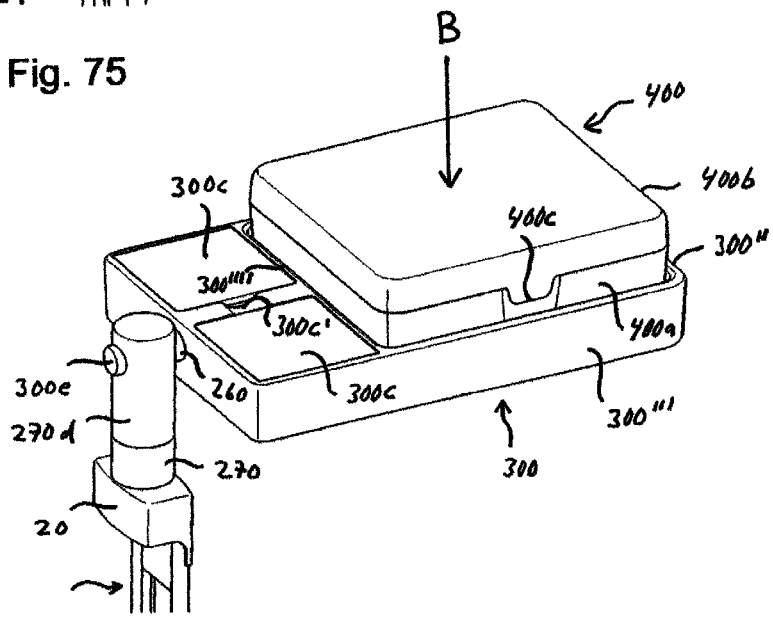
FIG. 75 shows a perspective view of the holder according to the representation in FIG. 74 with a container insetted in the shell-shaped recess of the holder with the cover closed.
Figure 76:
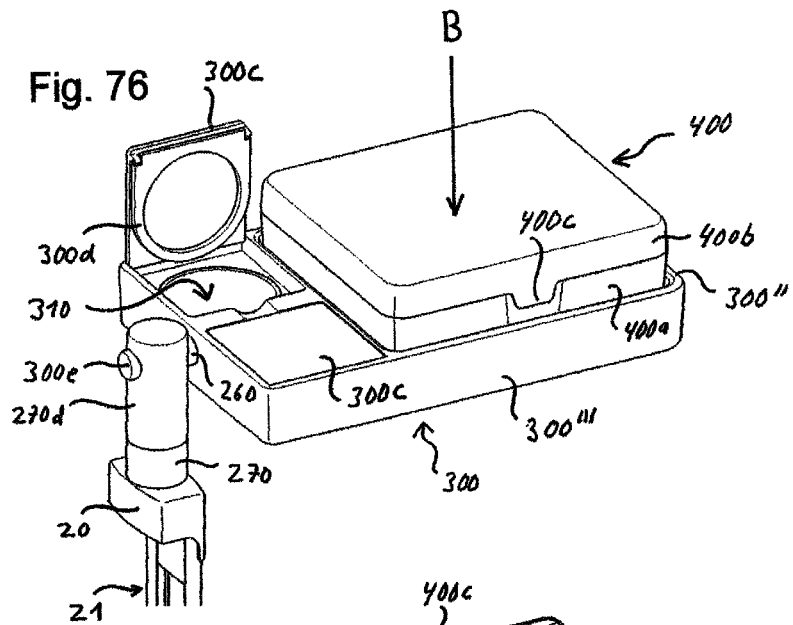
FIG. 76 shows a perspective view of the holder according to the representation in FIG. 75, with one of the two cup holders with the cover folded open.

Instead of the clips 300f and 300f" shown in FIG. 64 and FIG. 65 for holding the receiving shell 400a of container 400 on holder 300, in FIGS. 74, 78, and 79, lugs 311f', 311f" are fitted to holder 300, which snap into lugs correspondingly disposed (not shown) on receiving shell 400a.

The fastening apparatus shown in FIG. 72 to FIG. 77 in principle corresponds to the description of the representations in FIGS. 54 to 58, which are hereby referred to. For that reason, the corresponding reference symbols from FIG. 54 to FIG. 58 are also used.

Side A of the holder 300 comprises a flat tabletop 311, which is equipped with a non-slip coating and a circumferential edge 311', 311", 311''', 311'''', which prevents objects such as, for example, tablet computer 1 or mobile telephones 1' from falling from the tabletop 311 due to tilting of the holder 300 or lateral acceleration.

Holder 300 can be rotated steplessly about the first revolute joint 270 in a horizontal plane and inclined steplessly about the second revolute joint 280 so that, for example, the screen 1a of a tablet computer 1 or mobile telephone 1' attached to the holder 300 can be aligned steplessly toward the user.

Holder 300 can be rotated through 360° at the second revolute joint 280 (FIG. 59 to FIG. 65) and can be locked in both horizontal in-use positions and in both vertical out-of-use positions of the holder 300 with a latching device (for example, a sprung serration). The lock can be unlocked with the release button 300e.

Also, a friction brake is provided, which fixes the holder 300 in intermediate positions by means of friction.

FIG. 78 to FIG. 86 show a further embodiment of the device with a holder 500 disposed on the facing end 511a centrally on the pivot arm 560 supported so that it rotates 360° about the second revolute joint 580, which comprises, on one wide side (C), a first receiving shell 521 with a holder 540 disposed centrally in the first receiving shell 521 for a mobile telephone 1' as well as a storage shell 522 that is contiguous with the first receiving shell 521 and, on the other wide side (D), a second receiving shell 531 with a holder 550 disposed centrally in the second receiving shell 531 for a tablet computer 1.

The holder 500 comprises a holder plate 510 with a base wall 510a with two slide guides 512a, 512b aligned in parallel with the narrow side of the holder 500 for the two slides 541, 551 of the two holders 540, 550, and a bearing bush 511 disposed at the center of the facing end 511a for accommodating the pivot arm 560 as well as a first housing shell 520 and a second housing shell 530, which are placed on the upper and/or lower wide side of the holder plate 510 and are provided with corresponding recesses for both holders 540, 550.

The first housing shell 520 comprises the first receiving shell 521 for accommodating the holder 540 for a mobile telephone 1' as well as the storage shell 522, and the second housing shell 530 comprises the second receiving shell 531 for accommodating the holder 550 for a tablet computer 1.

U-shaped receiving pockets 523, 532 are provided on the side wall 521''' of the first receiving shell 521 and on the side wall 531''' of the second receiving shell 531, which grasp the edge of the appliances (mobile telephone 1' and/or tablet computer 1) on one side.

To secure the appliances 1,1' on the opposite edge, disposed holders 540, 550 are provided in the receiving shells 521, 531, which comprise a slide 541, 551 with a stop plate (541d, 551d), which can be adapted to different dimensions of the appliances 1, 1' by sliding and releasably fixed in the various positions.

On slide 541, 551, a retaining clip 545, 555 is disposed movably with a hold-down retainer 545c, 555c and preloaded with a spring 555d toward appliance 1, 1' and sufficiently mobile for the hold-down retainer 545c, 555c to cover the edge of the device 1, 1'.

The short side walls 521", 521"" of the first receiving shell 521 in which the holder 540 is disposed for a mobile telephone 1' as well as the short side walls 531", 531"" of the second receiving shell 531 in which the holder 550 is disposed for a tablet computer (1), form lateral stops for the appliances 1, 1' inserted in the holders 540, 550, so that said appliances cannot slip laterally out of the holders 540, 550.

Figure 82:
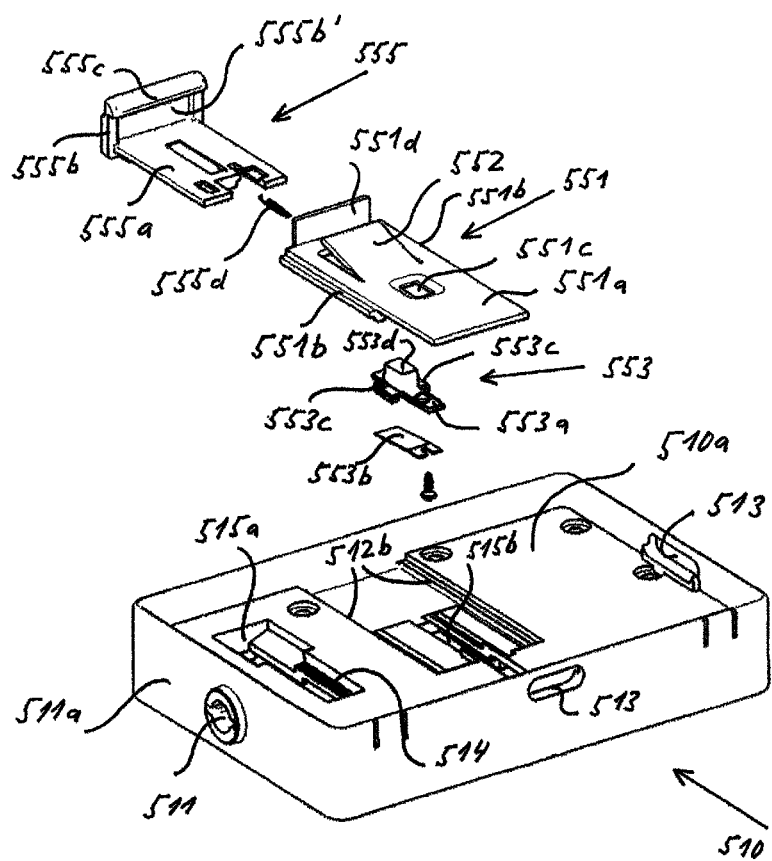
FIG. 82 shows an exploded view of the holder plate with the components of the retainer module for the tablet computer.
Figure 83:
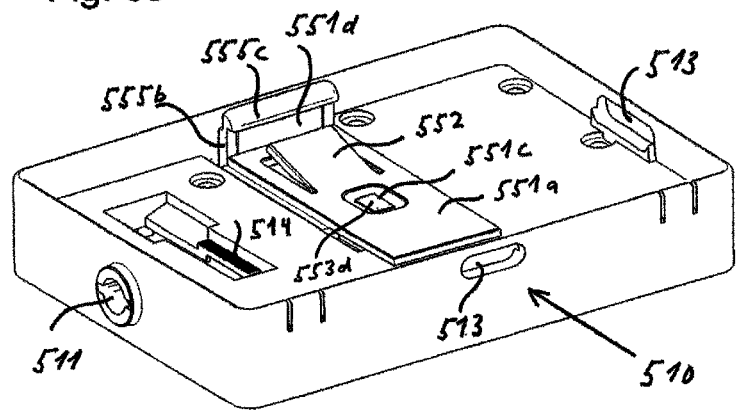
FIG. 83 shows a perspective view of the holder plate with the retainer for the tablet computer according to the representation in FIG. 82, in the mounted condition.
Figure 84:
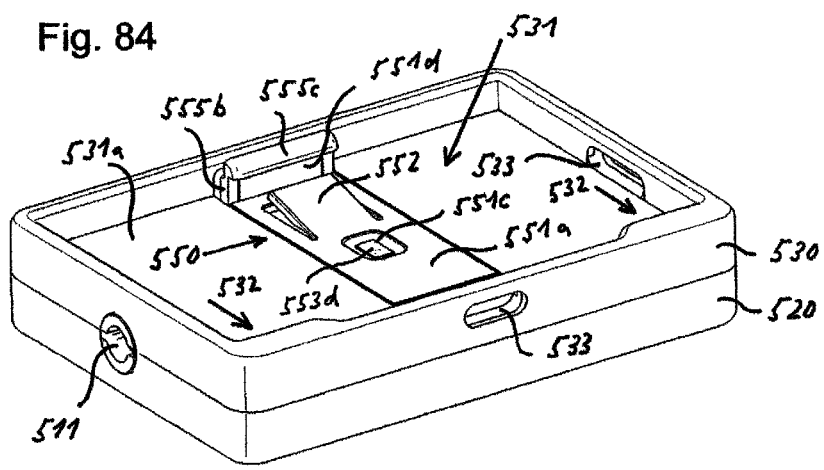
FIG. 84 shows a perspective view of the holder plate with the retainer for the tablet computer according to the representation in FIG. 83, with housing shells placed on top and the slide of the holder in the maximum position.
Figure 85:
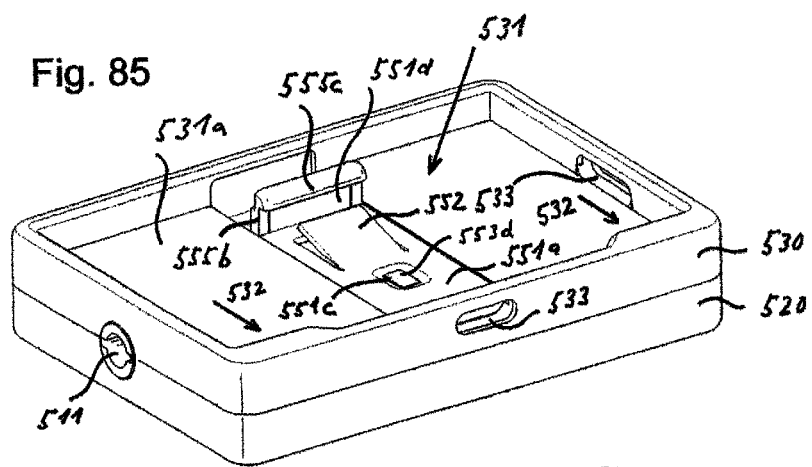
FIG. 85 shows a perspective view of the holder according to the representation in FIG. 84 with the slide of the holder for the tablet computer in the minimum position.

The holder 540 for a mobile telephone 1' and the holder 550 for a tablet computer 1 are constructed in the same way using identical parts and are described in detail below by means of the representations of the holder 550 for a tablet computer 1 in FIG. 82.

The holder 550 comprises a slide 551 with a base plate 551a and a stop plate 551d disposed at the end of the base plate 551a approximately perpendicular with respect to the base plate 551a.

Guide rails 551b are attached at the lateral edges of the base plate 551a, which are guided through the slide guides 512b of the base wall 510a of the holder plate 510a and together with said slide guides form a linear guide for the slide 551.

A locking element 553 is disposed on the underside of the base plate 551a, which is secured by means of a spring arm 553a supported by a locating spring 553b with a screw on the base plate 551a. On the base wall 510a, a recess 515b is provided for the locking element 553 so that the slide 551 can be moved without obstruction.

On the free end of the spring arm 553a, a release button 553d that protrudes through a button cutout 551c in the base plate 551a is attached with tooth segments 553c disposed on both sides, which are held by the locating spring 553b in the engagement with two toothed rails 514 disposed on the underside of the base wall 510a, and which retain the slide 551 in the desired positions. In order to move the slide 551, the release button 553d must be pressed, which causes the tooth segments 553c to be released from the toothed rails 514.

The tooth segments 553c and the toothed rails 514 are equipped with saw-tooth-shaped toothing, which allow the slide 551 to be pushed toward an appliance 1 inserted in the holder 550 without operating the release button 553d until the stop plate 551d makes contact with the end wall of the device 1, whereas the slide 551 can only be moved in the opposite direction when the release button 553d is operated.

On the slide 551, a retaining clip 555 is disposed having a base plate 555a, which is supported so that it slides longitudinally along the base plate 551a of the slide 551. At the free end of the base plate 555a, a stop wall 555b is disposed aligned approximately perpendicular with respect to the base plate 555a with a hold-down retainer 555c aligned approximately parallel with the base plate 555a and pointing toward the slide 551.

A tension spring 555d is disposed between the slide 551 and the retaining clip 555, which pulls the retaining clip 555 toward the slide 551 until the stop wall 555b of the retaining clip 555 is positioned at the stop plate 551d of the slide 551. On the stop wall 555b, a depression 555b' is provided, which accommodates the stop plate 551d of the slide 551.

The hold-down retainer 555c protrudes beyond the stop plate 551d and covers the edge of an appliance 1 inserted in the holder 550 outside the screen 1a, so that the appliance 1 cannot fall out of the holder 550.

In order to remove the appliance 1 from the holder 550, the retaining clip 555 must be pulled outward against the force of the tension spring 555d, until appliance 1 is free and can be lifted out of the holder.

A lifting facility 552 is attached to the upper side of the base plate 551a, which after the retaining clip 555 has been opened lifts the appliance 1 so far that it can be comfortably removed from the slide 551.

Plug openings 513, 524, 533 are provided on the side walls of holder plate 510 and housing shells 520, 530.

Figure 86:
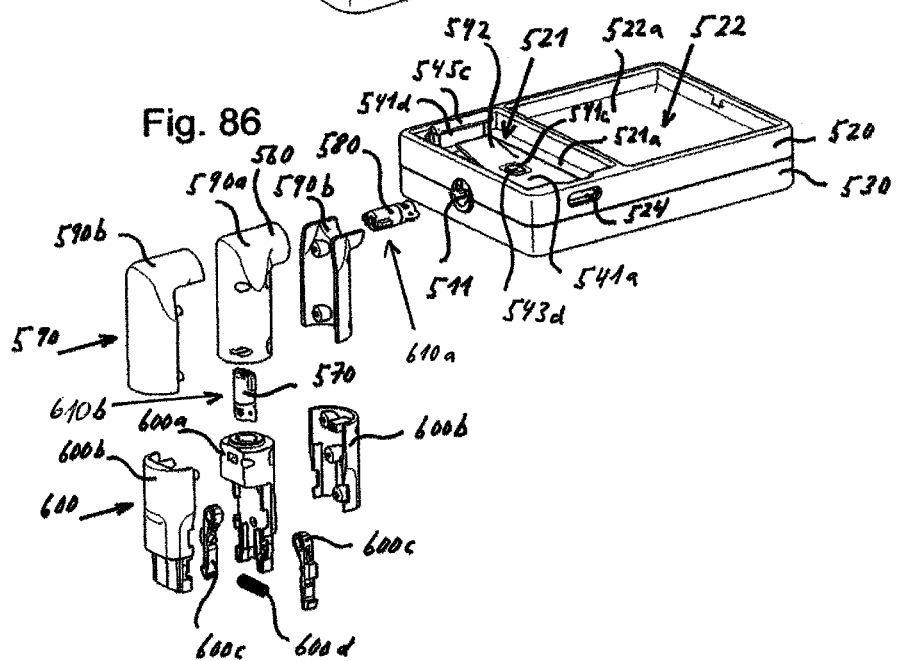
FIG. 86 shows a perspective view of the holder with an exploded view of the pivot arm, revolute column, and plug element, as well as with the first and the second revolute joint.

The support element 590 and the pivot arm 560 form a joint module with an L-shaped holder part 590a and two symmetrical housing shells 590b. A cylindrical connecting element 610a is inserted between the holder part 590a and the bearing bush 511 of the holder 500, which comprises the second revolute joint 580 as well as a friction brake (FIG. 86).

The plug element 600 comprises a holder part 600a in which the two lock arms 600c are supported and a compression spring, which presses the lock arms 600c apart, as well as two housing shells 600b are contained. A cylindrical connecting element 610b is inserted between the support element 590 and the plug element 600, which comprises the first revolute joint 570 as well as a friction brake (FIG. 86).

Figure 87:
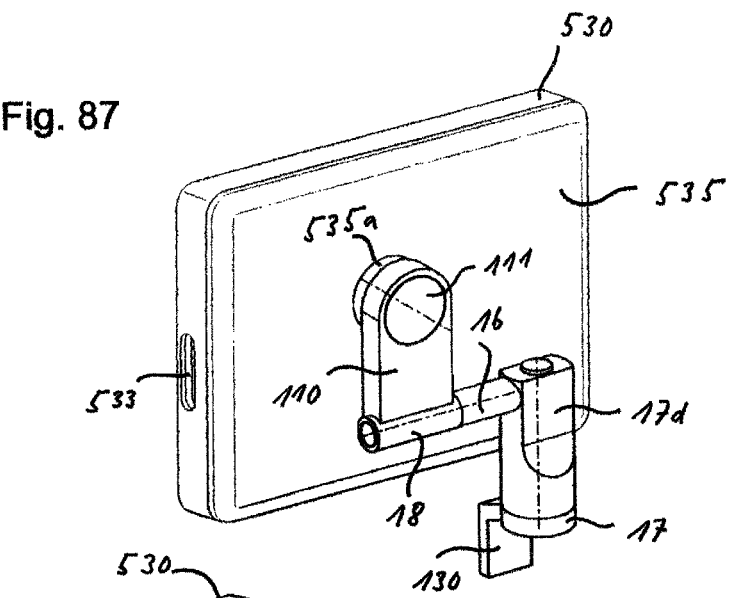
FIG. 87 shows a perspective view of a further embodiment of the device with a combination of the housing shell shown in FIGS. 79, 81, 82, 83, and 85, with a retainer for tablet computers of different sizes, covered by a flat rear wall equipped with a revolute joint and disposed on a transfer assembly according to the representation in FIG. 15 from the rear.
Figure 88:
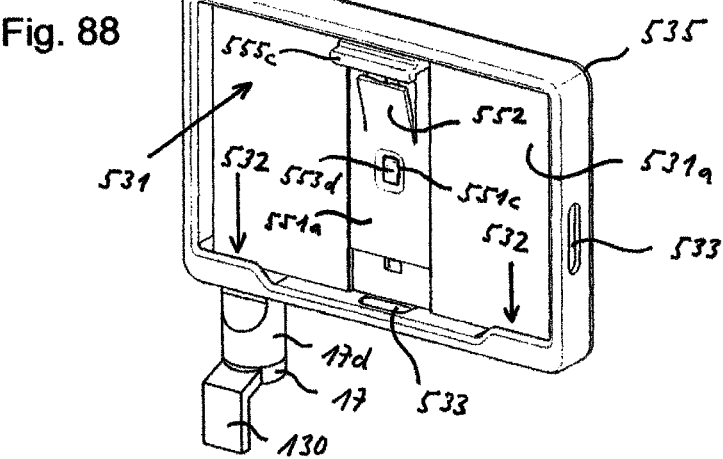
FIG. 88 shows a perspective view of the embodiment according to the representation in FIG. 87 from the front.

FIGS. 87 and 88 show a further embodiment of the device with the second housing shell 530 with a holder 550 disposed in the second receiving shell 531 for different sized tablet computers 1, combined with a flat rear wall 535 provided with a revolute joint 535a, attached to a transfer assembly (6, 7, 8, 10, 11, 16, 17, 18, 110, 111, 160, 170, 180, 560, 570, 580, 590) according to representation in FIG. 15 and FIG. 16, reference hereby being made to the description thereof.

We claim:

1. A retainer for flat appliances, approximately rectangular appliances, tablet computers or mobile telephones, the retainer comprising:
   a first holder comprising a first sidewall and a second sidewall opposite the first sidewall;
   a U-shaped receiving pocket connected to said first sidewall of said first holder, said receiving pocket structured to grip about one edge of the appliance when inserted into said first holder;
   a second holder, said second holder having a slide which is guided on said first holder in a linearly moveable manner in a sliding direction perpendicular to said first and second sidewalls and which can be locked at various positions, said second holder having a stop plate disposed on said slide at an end of said slide remote from said U-shaped receiving pocket, said stop plate being structured for abutment with an opposite edge of the appliance through displacement of said slide to be locked at that position together with said slide;
   a spring-mounted retaining clip having a hold-down retainer, wherein said retaining clip, with said hold-down retainer, is guided movably on said slide in said sliding direction of said slide; and
   a spring disposed, structured and dimensioned to preload said retaining clip against said stop plate of said second holder and to position said hold-down retainer at said stop plate so as to engage the opposite edge of the appliance and prevent the appliance from falling out of the retainer.

2. The retainer of claim 1, wherein said first holder comprises a base wall on which slide guides are disposed, wherein said slide is guided within said slide guides.

3. The retainer of claim 2, wherein said slide comprises a first base plate having guide rails with which said slide is guided in said slide guides.

4. The retainer of claim 3, wherein said stop plate is disposed at a free end of said first base plate and is substantially perpendicular to said first base plate.

5. The retainer of claim 3, wherein said retaining clip comprises a second base plate which is guided for longitudinal displacement in said first base plate of said slide.

6. The retainer of claim 5, wherein said retaining clip has a stop wall that is substantially perpendicular to said second base plate and that is disposed at a free end of said second base plate, wherein said hold-down retainer is aligned approximately parallel to said second base plate and is facing said slide.

7. The retainer of claim 6, wherein said spring is disposed between said slide and said retaining clip to pull said retaining clip toward said slide until said stop wall of said retaining clip is positioned at said stop plate of said slide.

8. The retainer of claim 6, wherein said stop wall of said retaining clip has a depression in which said stop plate of said slide is accommodated.

9. The retainer of claim 6, wherein said hold-down retainer protrudes beyond said stop plate of said slide to engage the opposite edge of the appliance.

10. The retainer of claim 1, further comprising a lock device disposed between said first holder and said slide in order to lock said slide on said first holder.

11. The retainer of claim 10, wherein said lock device has a release button for releasing said lock device.

12. The retainer of claim 10, wherein said lock device comprises a toothed rail disposed on said first holder and a tooth segment disposed movably on said slide and held with a locating spring for engagement with said toothed rail.

13. The retainer of claim 12, wherein said toothed rail and said tooth segment have saw-tooth-shaped toothing, wherein said toothing is structured such that said slide can be pushed toward the appliance inserted in said second holder without operating said release button but can only be moved in an opposite direction when said release button is operated.

14. The retainer of claim 1, wherein the retainer has a flat rear wall with a revolute joint with which said first holder can be rotated between portrait format and landscape format.

* * * * *